US012029225B2

(12) United States Patent
Hazell et al.

(10) Patent No.: US 12,029,225 B2
(45) Date of Patent: Jul. 9, 2024

(54) PROTEIN-CARBOHYDRATE COMPOSITE FOOD PRODUCT PRODUCED BY LOW MOISTURE EXTRUSION

(71) Applicant: V2 FOOD PTY LTD, Sydney (AU)

(72) Inventors: Nicholas John Gerald Hazell, Sydney (AU); Danyang Ying, Werribee (AU); Mary Ann Augustin, Werribee (AU); Peerasak Sanguansri, Werribee (AU)

(73) Assignee: V2 FOOD PTY LTD

( * ) Notice: Subject to any disclaimer, the term of this patent is extended or adjusted under 35 U.S.C. 154(b) by 318 days.

(21) Appl. No.: 17/269,345

(22) PCT Filed: Aug. 21, 2019

(86) PCT No.: PCT/AU2019/050883
§ 371 (c)(1),
(2) Date: Feb. 18, 2021

(87) PCT Pub. No.: WO2020/037368
PCT Pub. Date: Feb. 27, 2020

(65) Prior Publication Data
US 2021/0329942 A1    Oct. 28, 2021

(30) Foreign Application Priority Data
Aug. 21, 2018    (AU) ................ 2018903077

(51) Int. Cl.
*A23J 3/22*    (2006.01)
*A23J 3/16*    (2006.01)
(Continued)

(52) U.S. Cl.
CPC ............... *A23J 3/227* (2013.01); *A23J 3/16* (2013.01); *A23J 3/26* (2013.01); *A23L 29/231* (2016.08);
(Continued)

(58) Field of Classification Search
CPC ...... A23J 3/227; A23J 3/16; A23J 3/26; A23P 30/25; A23L 29/231; A23L 29/35; A23L 29/256
(Continued)

(56) References Cited

U.S. PATENT DOCUMENTS

| 3,898,345 A | 8/1975 | Horrocks et al. |
| 3,935,319 A | 1/1976 | Howard |

(Continued)

FOREIGN PATENT DOCUMENTS

| AU | 2008237295 A1 | 10/2008 |
| CN | 101215733 A | 7/2008 |

(Continued)

OTHER PUBLICATIONS

Oct. 21, 2019—(WO) International Search Report—Appl No. PCT/AU2019/050883.

(Continued)

*Primary Examiner* — Brent T O'Hern
(74) *Attorney, Agent, or Firm* — Banner & Witcoff, Ltd.

(57) ABSTRACT

The present disclosure generally relates to protein-carbohydrate composites for use as food ingredients, to processes for the preparation of said composites, to their use in the preparation of food products, and food products comprising said composites. In some embodiments the disclosure relates to the use of protein-carbohydrate composites and processes for their production for use in the preparation of meat mimetic food products.

24 Claims, 7 Drawing Sheets

(51) Int. Cl.
*A23J 3/26* (2006.01)
*A23L 29/231* (2016.01)
*A23L 29/256* (2016.01)
*A23L 29/30* (2016.01)
*A23P 30/25* (2016.01)

(52) U.S. Cl.
CPC .............. *A23L 29/256* (2016.08); *A23L 29/35* (2016.08); *A23P 30/25* (2016.08)

(58) Field of Classification Search
USPC .......................................................... 426/656
See application file for complete search history.

(56) References Cited

U.S. PATENT DOCUMENTS

| | | | |
|---|---|---|---|
| 4,338,340 | A | 7/1982 | Morimoto et al. |
| 4,379,084 | A | 4/1983 | Teranishi et al. |
| 4,755,393 | A | 7/1988 | Toba et al. |
| 5,786,020 | A | 7/1998 | Reimerdes et al. |
| 6,770,318 | B1 | 8/2004 | Roussell et al. |
| 9,314,045 | B2 | 4/2016 | Nishimura et al. |
| 2005/0003071 | A1 | 1/2005 | Cavallini et al. |
| 2008/0254199 | A1* | 10/2008 | Orcutt ................ A23L 11/07 426/656 |
| 2008/0268112 | A1* | 10/2008 | Rolan ................. A23L 13/65 426/601 |
| 2009/0208612 | A1 | 8/2009 | Reiser et al. |
| 2012/0093994 | A1 | 4/2012 | Hsieh et al. |
| 2014/0001092 | A1 | 1/2014 | Mezza et al. |
| 2014/0010920 | A1 | 1/2014 | Nishimura et al. |
| 2014/0220217 | A1 | 8/2014 | Brown et al. |
| 2015/0296834 | A1 | 10/2015 | Geistlinger |
| 2015/0296835 | A1 | 10/2015 | Anderson et al. |
| 2015/0305390 | A1 | 10/2015 | Vrljic et al. |
| 2015/0351435 | A1 | 12/2015 | Fraser et al. |
| 2017/0099856 | A1 | 4/2017 | Anderson et al. |
| 2017/0105438 | A1 | 4/2017 | Ajami et al. |
| 2017/0112175 | A1 | 4/2017 | Fraser et al. |
| 2017/0290363 | A1 | 10/2017 | Fraser et al. |
| 2017/0295833 | A1 | 10/2017 | Fraser et al. |
| 2018/0027851 | A1 | 2/2018 | Vrljic et al. |
| 2018/0168209 | A1 | 6/2018 | Fraser et al. |
| 2018/0192680 | A1 | 7/2018 | Fraser et al. |
| 2018/0199605 | A1 | 7/2018 | Fraser et al. |
| 2018/0199606 | A1 | 7/2018 | Fraser et al. |
| 2018/0310599 | A1 | 11/2018 | Ajami et al. |
| 2018/0368453 | A1 | 12/2018 | Brown et al. |
| 2019/0037893 | A1 | 2/2019 | Ajami et al. |
| 2019/0116855 | A1 | 4/2019 | Vrljic et al. |
| 2019/0200658 | A1 | 7/2019 | Vrljic et al. |

FOREIGN PATENT DOCUMENTS

| | | |
|---|---|---|
| EP | 2020868 A2 | 2/2009 |
| JP | 2014143969 A | 8/2014 |
| WO | 2005/096834 A2 | 10/2005 |
| WO | 2006041966 A1 | 4/2006 |
| WO | 2007/041470 A2 | 4/2007 |
| WO | 2008036906 A1 | 3/2008 |
| WO | 2008/043076 A2 | 4/2008 |
| WO | 2011/053786 A2 | 5/2011 |
| WO | 2013010042 A1 | 1/2013 |
| WO | 2014/110532 A2 | 7/2014 |
| WO | 2014110539 A1 | 7/2014 |
| WO | 2014/156948 A1 | 10/2014 |
| WO | 2015153666 A1 | 10/2015 |
| WO | 2015161099 A1 | 10/2015 |
| WO | 2015161105 A1 | 10/2015 |
| WO | 2017070303 A1 | 4/2017 |

OTHER PUBLICATIONS

Palanisamy et al. Influence of iota carrageenan addition on the properties of soya protein meat analogues, LWT—Food Science and Technology 87 (2018) 546-552.

Koch et al. Improving the emulsifying properties of whey protein isolate-citrus pectin blends by a novel reactive extrusion approach, Journal of Food Engineering, 223, (2018) 175-188.

Dekkers et al. Shear-induced fibrous structure formation form a pectin/SPI blend, Innovative Food Science and Emerging Technologies 36 (2016) 193-200.

Ajita et al. Extrusion Cooking Technology: Principal Mechanism and Effect on Direct Expanded Snacks—an Overview, International Journal of Food Studies, Apr. 2017, vol. 16, 113-128.

Krintiras et al. On the use of the Couette Cell technology for large scale production of textured soy-based meat replacers, Journal of Food Engineering, 169, (2016) 205-213.

Dekkers et al. Structuring processes for meat analogues, Trends in Food Science & Technology, 81, (2018) 25-36.

Deora et al. Structuring Meat Analogues Using Extrusion: an Insight. EC Gastroenterology and Digestive System 6.1 (2019): 29-31.

Geerts et al. Aqueous fractionation of processes of soy protein for fibrous structure Innovative Food Science and Emerging Technologies 45 (2018) 313-319.

* cited by examiner

| Pea Protein Isolate | PPI: MD DE30 (67:33) | PPI: Pectin E 50-75 (96:4) |
| --- | --- | --- |
| Barrel Moisture (%):38 | Barrel Moisture (%): 36 | Barrel Moisture (%):30 |
| Die Pressure (bars):2.0 | Die Pressure (bars): 2.7 | Die Pressure (bars):3.5 |
| Feed Rate (kg/hr): 6.0 | Feed Rate (kg/hr): 8.7 | Feed Rate (kg/hr): 9.1 |
| Screw Speed (rpm): 154 | Screw Speed (rpm): 115 | Screw Speed (rpm):115 |

PROTEIN-CARBOHYDRATE COMPOSITE FOOD PRODUCT PRODUCED BY LOW MOISTURE EXTRUSION

RELATED APPLICATIONS

This application is a National Stage Application under 35 U.S.C. 371 of co-pending PCT application PCT/AU2019/050883 designating the United States and filed Aug. 21, 2019; which claims the benefit of AU application number 2018903077 and filed Aug. 21, 2018 each of which are hereby incorporated by reference in their entireties.

FIELD

The present disclosure generally relates to protein-carbohydrate composites for use as food ingredients, to processes for the preparation of said composites, to their use in the preparation of food products, and food products comprising said composites. In some embodiments the disclosure relates to the use of protein-carbohydrate composites and processes for their production for use in the preparation of meat mimetic food products.

BACKGROUND

With a need to feed a growing world-wide population, estimated to reach 9.7 billion people by 2050, there is a need to rebalance the animal derived component of the world's food sources to achieve sustainable food systems and increased food and nutrition security. Plant-derived alternatives to meat products represent a growing market due to the shifting dietary patterns of consumers. Increasingly, consumers are concerned about the impact the food production system on the environment, climate change and animal ethics, and this influences the choices they make about food purchases. Vegans, vegetarians, and even animal meat eaters are driving demand for meat alternatives made entirely or substantially from non-animal products.

However, many consumers are not willing to eliminate or reduce meat consumption on the basis of ecological and ethical reasons alone. Since the 1960s, textured soy protein products, prepared from soy flour or concentrate using extrusion technology at low moisture levels, have become a popular replacement for minced or ground meat. However, animal meat comprises a complex matrix of protein structures and fibres, within which are trapped fats, carbohydrates and water, and which contribute to the sensory, textural and structural characteristics (e.g. flavour, chewiness, juiciness) of the meat-containing food product, and recreating the complex fibrous texture of animal meat from non-meat protein sources, such as soy and pea proteins, has proven challenging. Beyond committed vegetarians and vegans, ready consumer acceptance of these traditional meat mimetic products is compromised due to the non-meat like textures achieved by the conventional low moisture extrusion processes—typically spongy, mushy or rubbery.

More recently, high moisture extrusion of plant-obtained proteins has been used as a means of introducing layered or fibrous structures, thereby producing a food product or ingredient therefor that may more closely mimic the fibrous texture of animal meat proteins. High moisture extrusion of plant proteins involves plasticizing the protein molecules by applying heat and shear to a protein:water mixture (greater than 40%, and typically about 45% to 55%, or even up to 70%, by weight of water) in a heated extruder barrel, followed by forcing the plasticized protein melt through a cooling die positioned at the end of the extruder. Forcing the melt through the cooling die results in molecular alignment of the peptide and protein molecules, and affords a fibrous anisotropic structure. High moisture levels also facilitate the extrusion process: as the plasticized protein cools in the die, it becomes less flowable, and thus higher moisture levels assist with forcing the plasticized protein through the die. However, although high moisture extrusion conditions provide practical processing advantages and more desirable textural properties in the resulting product, it is less efficient than low moisture extrusion due to the consequential lower throughput of "dry" matter in the extruder. Furthermore, use of high moisture levels results in a product that contains high amounts of water, and thus requires more energy intensive drying conditions of the resulting product and/or refrigeration to avoid spoilage due to the high water content.

Thus, there exists a continued need for food ingredients for use in meat mimetic food products that may in one or more respects more closely resemble animal meat-derived products, and for processes for obtaining such ingredients.

SUMMARY

It has now been found that extrusion processing of protein-carbohydrate mixtures or blends under low moisture conditions, may allow for the production of protein-carbohydrate composites that possess one or more desirable physical properties or sensory attributes useful in the preparation of meat mimetic food products. In some embodiments, the processes of the disclosure afford food ingredients that may contribute to a fibrous or cartilaginous textural component of a meat mimetic food product.

Accordingly, in a first aspect there is provided a process for preparing a protein-carbohydrate composite food ingredient, comprising the step of mixing a protein source and a carbohydrate source in an extruder and subjecting the protein source and the carbohydrate source to low moisture extrusion to produce a protein-carbohydrate composite.

A further aspect of the disclosure provides a protein-carbohydrate composite food ingredient prepared by mixing a protein source and a carbohydrate source in an extruder and subjecting the protein source and the carbohydrate source to low moisture extrusion to produce a protein-carbohydrate composite.

Another aspect of the disclosure provides a food product, such as a meat mimetic food product, comprising a protein-carbohydrate composite prepared by mixing a protein source and a carbohydrate source in an extruder and subjecting the protein source and the carbohydrate source to low moisture extrusion to produce a protein-carbohydrate composite.

In some embodiments, the low moisture extrusion is performed in the extruder at one or more temperatures in the range of about 40-180° C. at a barrel moisture level of 39-30% by weight.

In some embodiments, including any of the above, the total protein content added to the extruder is at least, 70% w/w on a dry weight basis.

In some embodiments, including any of the above, the protein-carbohydrate composite leaving the extruder barrel is held in an ambient temperature or a heated die.

In some embodiments, including any of the above, the protein source comprises or consists of soy protein liquor, soy protein concentrate or soy protein isolate. In some embodiments the protein source comprises or consists of pea protein liquor, pea protein concentrate or pea protein isolate. In some embodiments, the protein source comprises or consists of faba bean protein liquor, faba bean protein concentrate or faba bean protein isolate. In some embodiments the protein source comprises or consists of one or more of soy protein liquor, soy protein concentrate, soy protein isolate, pea protein liquor, pea protein concentrate, pea protein isolate, faba bean protein liquor, faba bean protein concentrate or faba bean protein isolate, lupin protein liquor, lupin protein concentrate or lupin protein isolate.

In some embodiments, including any of the above, the carbohydrate source comprises or consists of any one or more of sugars, oligosaccharides, maltodextrin, pectin, dried glucose syrup, carrageenan (iota, kappa and or lambda), gums, fibre, starch (including low amylose starches (0-25% amylose content) and high amylose starches (>40% amylose content)), resistant starch or modified starches, β-glucan or β-glucan rich sources or potato flour or other flour from plant sources.

In some embodiments the protein source is or comprises pea protein isolate and the carbohydrate source is or comprises pectin.

DESCRIPTION

Figure 1A:
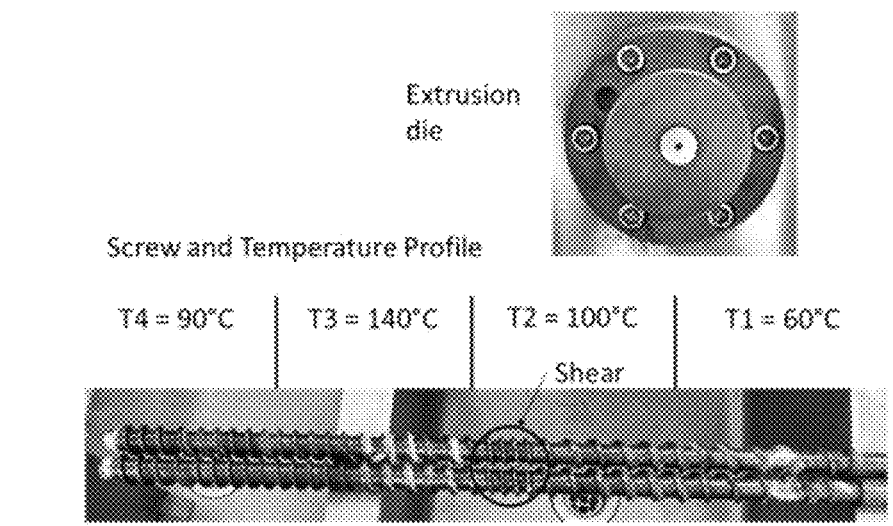
FIG. 1A illustrates a screw and temperature profile for selected sections of an exemplary extrusion trial.

Throughout this specification and the claims which follow, unless the context requires otherwise, the word "comprise" and variations such as "comprises" and "comprising" will be understood to imply the inclusion of a stated integer or step or group of integers but not the exclusion of any other integer or step or group of integers or steps.

Throughout this specification and the claims which follow, unless the context requires otherwise, the phrase "consisting essentially of", and variations such as "consists essentially of" will be understood to indicate that the recited element(s) is/are essential i.e. necessary elements of the invention. The phrase allows for the presence of other non-recited elements which do not materially affect the characteristics of the invention but excludes additional unspecified elements which would affect the basic and novel characteristics of the invention defined.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The singular forms "a", "an" and "the" include plural aspects unless the context clearly dictates otherwise.

The term "invention" includes all aspects, embodiments and examples as described herein.

As used herein, "about" refers to a quantity, value or parameter that may vary by as much as 25%, 20%, 15%, 10%, 5%, or 1-2% of the stated quantity, value or parameter, and includes at least tolerances accepted within the art. When prefacing a recited range or list of values, it is intended to apply to both upper and lower limits of the range and each member of the list.

Unless the context indicates otherwise, features described below may apply independently to any aspect or embodiment of the invention As used herein, a meat mimetic food product refers to a food product that mimics, resembles or performs in a manner similar to an animal-derived meat product in any one or more physical or sensory factors, including pertaining to appearance, taste, texture, mouthfeel (moistness, chewiness, fattiness etc), aroma, or other physical properties, including structure, texture, storage, handling, and/or cooking.

In some embodiments of the disclosure, the food ingredient or the meat-mimetic product comprising the food ingredient does not contain or include, or does not substantially contain or include, any ingredient derived or obtained from animal sources. However, it is to be understood that the present disclosure is not so limited, and in other embodiments, meat mimetic food products or ingredients therefor may contain a proportion of one or more animal derived ingredients, including any one or more of muscle, fat, cartilage and connective tissue, offal or blood, or components thereof, for example in an amount of up to about 5%, 10%, 15% 20%, 25%, 30%, 35%, 40%, 45% or 50% by weight of the food ingredient or meat mimetic food product.

As used herein, "protein-carbohydrate composite" refers to a blend or mixture comprising one or more non-animal (e.g. plant) derived protein sources and one or more carbohydrate sources that has been subjected to low moisture extrusion. In some embodiments, the low moisture extrusion is conducted at one or more temperatures in the range of about 40-180° C. Without limiting the disclosure by theory, under certain conditions, (for example from about 80 or 120° C. to less than about, or about, 180° C.), where the carbohydrate source contains a reducing sugar, the carbonyl group of the reducing sugar can react with an amino group of an amino acid, peptide, polypeptide or protein, resulting in covalently linked molecules referred to as protein-carbohydrate conjugates or Maillard reaction products (MRPs). Thus, in some preferred embodiments the protein-carbohydrate composite produced by low moisture extrusion comprises protein-carbohydrate conjugates (Maillard reaction products) in addition to protein and carbohydrate components.

It will be understood that the protein and carbohydrate sources referred to herein are discrete or separately sourced components of the extrusion mixture and are distinguished from, for example, protein sources per se (e.g. soy or pea protein liquor, concentrate or isolate) that may inherently contain a small proportion of a carbohydrate, and any carbohydrate sources per se that may contain a small proportion of protein. Thus, for the purpose of the present disclosure, a protein source that may inherently contain some carbohydrate, such as pea, soy, faba bean or lupin protein liquor, concentrate or isolate, does not constitute "a protein source and a carbohydrate source".

Protein sources suitable for use in the processes and products of the disclosure include non-animal (e.g. plant)-derived protein sources, i.e. proteins, polypeptides and amino acids derived from a non-animal source, for example beans (e.g. soy beans, kidney beans, lima beans, black beans, faba beans), chick peas (garbanzo), peas, lentils and lupin. The protein source used may be a single protein source or a mixture of one or more protein sources.

Plant derived protein sources can be obtained by various means that may include dehulling and milling the beans or legumes to afford a flour or flakes, and subsequent extraction and/or precipitation steps to substantially fractionate the oils and fats, carbohydrate and protein components, to afford an extract or liquor concentrate in aqueous slurry form, comprising the protein fraction. Subsequent drying (e.g. spray drying) of the extract or liquor affords a powder form of the protein fraction, which may be referred to as a protein concentrate or protein isolate, depending on the protein content as discussed below.

In some embodiments, the protein source consists of or comprises a protein liquor. As used herein, "protein liquor" refers to an aqueous protein concentrate slurry obtained from the protein extraction or fractionation process. In some embodiments, the protein liquor may be used directly in the processes of the disclosure, or may be further diluted or concentrated as appropriate. In some embodiments, the use of protein liquor may negate, minimize or reduce the requirement of additional water to be added to the extruder. The protein liquor may be such that it of an appropriate water content, taking into account the moisture content of dry ingredients used, or can be supplemented with other wet and/or dry ingredients to achieve the appropriate water content in the extruder, for example, one or additional protein liquors (more or less concentrated, from the same plant source or different), aqueous solutions aqueous suspensions, aqueous emulsions or powder forms of protein sources, and/or the carbohydrate source and/or other optional ingredients may be mixed with the protein liquor prior to feeding into the extruder, or may be added separately.

In some embodiments the protein source consists of or comprises a dry powder protein concentrate or protein isolate. As used herein, "protein concentrate" refers to the powder form, containing less than 80% by weight protein on a dry weight basis, for example, about 65%, 68-70% or 72-73% or about 75%, by weight protein. As used herein, "protein isolate" refers to the powder form, containing at least 80% weight protein on a dry weight basis, for example about 81, 82, 83, 84, 85, 86, 87, 88, 89, 90, 91, 92, 93 94 or 95% weight protein.

Some examples of protein sources include pea protein liquor, pea protein concentrate, pea protein isolate (PPI), soy protein liquor, soy protein concentrate, soy protein isolate, faba (fava) bean protein liquor, faba (fava) bean proteinconcentrate, faba (fava) bean protein isolate, lupin protein liquor, lupin protein concentrate, lupin protein isolate. Other protein sources may include those obtained (e.g. in dry powder or liquor form) from nuts, seeds, vegetables and beans, algae, and microbial and fungal sources, e.g. peanuts, potato, rice, hemp, sunflower, flaxseed, wheat, corn, sorghum, chickpea, barley, quinoa, maca, and fungal protein from *Fusarium Venenatum*. In some embodiments, one or more proteins sources may be hydrolyzed. In some embodiments one or more protein sources may be non-hydrolyzed.

The protein source may be obtained from a native or naturally occurring plant, or a genetically modified or mutated plant, or mixtures thereof. In still other embodiments, the protein source may comprise, synthetic or biosynthetically generated protein or polypeptide molecules.

In some preferred embodiments, the protein source, whether a single protein source or a mixture of protein sources, has an overall protein content of at least 70% (w/w) protein on a dry weight basis, such as at least about 71, 72, 73, 74, 75, 76, 77, 78 or 79% (w/w) protein. In further embodiments, the overall protein content of the protein source is at least 80% (w/w) protein on a dry weight basis, such as at least about 81, 82, 83, 84, 85, 86, 87, 88, 89 90, 91, 92, 93, 94, or 95% (w/w).

Carbohydrate sources may include one or more of sugars, starches, gums, pectins and fibres, and may include monosaccharides, disaccharides, polysaccharides and oligosaccharides and mixtures of two, three or four thereof, and be in any suitable form, such as milled, ground or powdered. The carbohydrate source may be obtained from a single or multiple plant sources. Some suitable examples may include any one, or a mixture of two or more of starch (e.g. potato, rice, wheat, corn, oat, pea, cassava), resistant starch, for example, retrograded starch, high amylose starch (e.g. having at least about 40, 45, 50, 55, 60, 65, 70, 75, 80, 85, 90 or 95% amylose content, such as Hylon V, Hylon VII, Hi-Maize 1043, Hi-Maize 240, Hi-Maize 260, Novelose 330, Novelose, 240, Novelose 260) pectin, fructans (e.g. inulins) ☐-glucan, carrageenan (iota, kappa, lambda), maltodextrin, methyl cellulose, alginate, guar gum, xanthan gum, gum carboxymethyl cellulose, locust bean gum, gellan gum, cellulose, hemicellulose, gums, flour (e.g. milled or ground from a grain, legume or tuber, such as wheat, rice, corn, oat, rye, barley, quinoa, amaranth, potato, carrot) and edible fibre such as oat bran, wheat bran rice bran, barley bran corn bran, and carrot fibre. In some embodiments, the carbohydrate source, or the barrel mixture, does not contain, or does not substantially contain (e.g. less than about 5, 4, 3, 2, or 1% (w/w)) an edible fibre.

The carbohydrate source may be obtained from the native or naturally occurring plant, or a genetically modified or mutated plant, or mixtures thereof. In still other embodiments, the carbohydrate source may comprise, synthetic (e.g. chemically esterified) or biosynthetically generated monosaccharides, disaccharides, polysaccharides and oligosaccharides molecules.

In some embodiments, the carbohydrate source contains a reducing sugar group, i.e. having a free carbonyl group able to participate in reaction with amino groups in the protein source to form Maillard reaction products. The carbohydrates source, for example pectin or starch, or the protein-carbohydrate mixture or blend may be supplemented with additional amounts of one or more reducing sugars (such as one or more mono- di- or trisaccharides or oligosaccharides). Some further examples of reducing sugars which may be added to the main carbohydrate source or sources, or separately into the extruder mixture, include: glucose, galactose, fructose, glyceraldehyde, ribose, xylose, cellobiose, maltose, isomaltose, lactose and maltotriose.

In some embodiments, carbohydrate source has been mechanically or chemically treated prior to mixing with the protein source, for example to increase the number of reducing carbonyl groups. Suitable pre-treatment process may include microfluidization, ultrasound treatment or high pressure extrusion. For example, starch may be mechanically or chemically treated to increase the content of resistant starch, for example, from a low amylose starch, having an amylose content of less than about 25-30%, to an amylose content of at least about 50-80%. In some embodiments the carbohydrate source may be an esterified carbohydrate, such as high methoxy pectin, with about >50% degree of esterification, as well as low methoxy pectin (about <50% degree of esterification, or substituted fatty acids starch esters, e.g. acetylated, propionated or butylated starches with various degrees of substitution.

The protein-carbohydrate blend or mixture may contain the protein source and the carbohydrate source in a suitable weight ratio that affords the desired property of the extruded food ingredient. Some examples of protein source: carbohydrate source ratios (w/w) for use in the present disclosure include about 50:50, 55:45, 60:40, 65:35, 70:30, 75:25, 80:20, 85:25, 90:10, 92:8, 94:6, 95:5, 96:4, 98:2. In some embodiments, the protein-carbohydrate blend or mixture is one or more of soy protein liquor, soy protein concentrate, soy protein isolate, pea protein liquor, pea protein concentrate, pea protein isolate and one or more of pectin, gum, starch or fibre, in a protein source:carbohydrate source w/w ratio of about 90:10, 91:9, 92:8, 93:7, 94:6, 95:5, 96:4, 97:3, 98:2 or 99:1.

In some further embodiments, the total protein content on a dry weight basis, e.g., of the combined protein and carbohydrate sources, is at least about 70%, or 75% (w/w) protein on a dry weight basis, preferably at least about 80% (w/w) protein, or at least 83-85% (w/w) protein, or at least 90% (w/w) protein, such as about 91% (w/w), or about 92% (w/w), or about 93% (w/w), or about 94% (w/w), or about 95% (w/w), or about 96% (w/w), or about 97% (w/w), or about 98% (w/w), or about 99% (w/w).

In some embodiments, the protein source consists of or comprises pea protein isolate and the carbohydrate source consists of or comprises pectin.

The extrusion process conveniently combines concurrent mechanical stresses (shear) and heating. Thus, subjecting the protein source and carbohydrate source to extrusion comprises the step of mixing the protein source and carbohydrate source in an extruder. Thus, the precursor ingredients (protein and carbohydrate sources, together with water and any optional additional ingredients) are typically fed into a stationary smooth or grooved bore barrel, containing one or more rotating screw shafts within the barrel, which is terminated by a restriction (breaker plate) and, optionally, a die. In some embodiments, single or double screws mix and transport the ingredients down the shaft of the barrel, thereby subjecting the ingredients to a mechanical shear. Conditions, such as temperature and or pressure, within the barrel may be zoned to provide a varying temperature/pressure profile to which the mixture is subjected. At the end of the barrel, the mixture may be forced through a die. Traditionally such as in high moisture extrusion of protein, a holding die which is actively cooled, for example by a water jacket, is used as a cooling zone to "set" the plasticized mixture. In some embodiments, the holding die is cooled, for example with water at a temperature of 20, 25 or 30° C., however, in some embodiments of the present disclosure, the holding die is heated to maintain or increase the temperature of the melt exiting the extruder, or to slow the rate of cooling of the melt or maintain a specified temperature. Suitable heating temperatures for the die may be in the range of about 50-120° C., for example 55, 60, 65, 70, 75, 80, 85, 90, 95, 100, 105, 110, 115 or 120°. In other embodiments, the die is neither actively heated nor cooled (also referred to herein as at ambient temperature). In some embodiments, the use of an ambient temperature (non-heated) die or heated die (as opposed an actively cooled die), may potentially generate protein-carbohydrate conjugation and cross-linking of proteins.

Suitable extrusion equipment is known in the art, and may include single or twin screw extruders, or multiple screw extruders, such as in a planetary roller extruder. Heating of the mixture within the barrel may be effected by the heat generated by the physical shear process and/or by an external heat generating source, e.g. electrical heating. An exemplary extruder is described further in the Examples section.

The protein source(s) and carbohydrate source(s) can be added to the extruder barrel as dry components simultaneously or separately, or maybe first blended (e.g. in a ribbon or planetary blender) and added as a dry blend of protein and carbohydrate sources, together with any other optional dry ingredients. Alternatively, the protein and carbohydrate sources, or the blended protein and carbohydrate sources may be added to the extruder barrel as a wet mixture such as a crumble or an aqueous or liquid slurry using some or all of the aqueous phase for the extrusion process. The aqueous phase may include protein liquor, water, aqueous solutions, suspensions or emulsions, or a mixture thereof. In some embodiments, some or all of the protein and carbohydrate sources may first be subjected to preliminary suitable heating conditions (for example at a temperature in the range of about 80-180° C., such as about 100, 120, 140 or 160° C. for a period of about 20-90 minutes, such as 30 or 60 minutes) to pre-form some Maillard reaction products, for example an aqueous wet mixture of protein and carbohydrate comprising, for example a mixture of protein liquor and/or an aqueous slurry of dried protein, and dried carbohydrate sources in water could be heated to induce formation of some Maillard reaction products and this mixture or slurry then fed into the extruder.

One or more optional ingredients (i.e. may be present or absent) may be added to the extruder barrel together with the protein and carbohydrate sources and aqueous phases. Some non-limiting examples of optional ingredients include pH adjusting agents, Maillard reaction promoting agents, cross-linking agents, enzymes, phenolic compounds, flavouring agents, colouring agents, fats, oils (e.g. plant derived oils, such as canola, sunflower, olive, coconut, vegetable, palm, peanut, flaxseed, cotton seed, corn, safflower, rice bran oil, optionally added in an amount of from about 0.5, 1, 2, 3 or up to about 5% (w/w)), lipids, fatty acids (e.g. omega-6 (e.g. linoleic acid) and omega-3 fatty acids (such as ALA, EPA, DHA) and their esters, and phospholipids containing such fatty acids, binding agents, emulsifiers (e.g. lecithin, polysorbates (20, 40, 60 80)), antioxidants, surfactants, salts, and nutritional agents e.g. essential amino acids (histidine, isoleucine, leucine, lysine, methionine, phenylalanine, threonine, tryptophan, and valine), vitamins (e.g. A, B (1, 2, 3, 5, 6, 7, 9, and 12), C, D, E, K), minerals (calcium, phosphorus, magnesium, sodium, potassium, zinc, iodine, iron, copper.), and phytonutrients, such as carotenoids (e.g. α- and β-carotene, β-cryptoxanthin, lycopene, lutein), flavonoids (e.g. flavonols, flavonols flavones, flavonones, isoflavones,), polyphenols (e.g. anthocyanins, quercetin, ellagic acid)). While in some embodiments one or more optional ingredients may be included in the barrel mixture, in some embodiments one or more such ingredients may be excluded. It will be understood that one or more optional agents may serve one or more functions.

Optionally one or more other Maillard reaction promoting agents may be added to the protein-carbohydrate mixture or blend. Examples of such agents may include agents that possess the necessary functionality to participate in a Maillard reaction, such as an agents that possess a reducing carbonyl group, for example mono-, di- and trisaccharides as described herein, ascorbic acid, or agents that possess an amino group, for example one or more amino acids, such as alanine, asparagine, cysteine, glutamine, glycine, isoleucine, leucine, methionine, phenylalanine, proline, serine, threonine, tryptophan, tyrosine, valine, aspartic acid, glutamic acid, arginine, histidine, and lysine, or hydrolysed protein.

In some embodiments, the barrel mixture may include one or more crosslinking agents to promote covalent coupling between carbohydrate-carbohydrate, carbohydrate-protein and/or protein-protein molecules. It will be understood that "carbohydrate" includes monosaccharides, disaccharide, polysaccharide and oligosaccharides and that "protein" includes amino acids, peptides, polypeptides and proteins. Crosslinking agents may include chemical and/or enzymatic crosslinking agents. Some examples include transglutaminase (TG), and oxidative enzymes such as laccases, tryosinases and peroxidases, as well as phenolic compounds such as caffeic acid, catechin, ferullic acid and tannic acid. Enzymes that catalyse the breakdown of larger molecules, such as amyloglucosidases, lignilytic enzymes, proteases and pectinases may also be added (see for example, Gatt, E., Industrial Crops and Products, 122, 329-339, 2018). In other embodiments, the barrel mixture does not include or substantially does not include an additional crosslinking agent.

In some embodiments, the low moisture extrusion process is carried out at the inherent pH of the barrel mixture (for example at a pH in the range of about 6-7). Formation of Maillard reaction products may be facilitated by higher pH conditions, and, thus, in some embodiments a pH adjusting agent may be added to increase the pH of the initial barrel mixture. Thus, in some embodiments, the low moisture extrusion process is carried out at a pH of or greater than 7. In some more embodiments, the heat and shear treatment process is carried out at a pH of about 7.5 or greater, or a pH of about 8.0 or greater, or a pH of about 8.5 or greater, or a pH of about 9. The desired pH may be achieved or adjusted, by a pH adjusting agent. Exemplary pH adjusting agents include any organic or inorganic agent capable of raising, lowering or maintaining the pH of the protein-carbonate/aqueous mixture prior to or during heat and shear treatment. Some examples of pH adjusting agents include bicarbonates, carbonates, phosphates and hydroxides, such as sodium bicarbonate, potassium bicarbonate, calcium bicarbonate, magnesium bicarbonate, sodium hydroxide, potassium hydroxide, calcium hydroxide, magnesium hydroxide, calcium carbonate, sodium phosphate, calcium phosphate, magnesium phosphate, potassium phosphate. The pH adjusting agent may be dissolved or suspended in the liquid (e.g. water, aqueous or emulsion) phase. The pH adjusting agent is of "food grade", being acceptable for inclusion into a food product intended for human or animal consumption. The pH adjusting agent is added in any quantity suitable to attain the desired pH of the protein-carbohydrate blend. In some embodiments, the pH adjusting agent may be added in an amount of up to about 10% by weight of the total mixture, for example, up to 0.5-1%, 1-2%, or 3-5%, or 7-8% by weight of the total mixture.

As used herein, "low moisture" refers to a total initial moisture content of the extruder barrel ("barrel moisture") of 40% (w/w) or less than 40% (w/w). In calculating the initial barrel moisture content, the respective moisture contents of the barrel ingredients, such as the carbohydrate and protein sources, and all other ingredients, fed into the extruder is taken into consideration.

In some embodiments, low moisture refers to a barrel moisture content in the range of about 40-35% (w/w) (e.g. about 39, 38, 37 or 36%) or less, or 35-30% (w/w) (e.g. about 34, 33, 32 or 31%) or less, or about 30-25% (w/w) (e.g. about 28 or 26%) or less, or about 25-20% (w/w), or about 20-15% (w/w), or about 15-10% or about 10-5%, or less, e.g. about 4%, or about 3%. Conversely, high moisture extrusion refers to >40% (w/w) barrel moisture, for example at least 45-50% (w/w), such as at least about 55%, 60%, 70% or 75%.

Desired barrel moisture levels may be achieved by the addition of water, either as water per se, an aqueous solution or suspension containing additional ingredients, or oil-in-water emulsion, the use of protein liquors, or protein/carbohydrate slurries, or a combination thereof. Some or all of the water, aqueous solution or suspension or emulsion may be pre-mixed with one or both of protein and carbohydrate sources and any additional ingredients (separately or together) to form a slurry feed for the extruder barrel, or may be simultaneously added with the protein and carbohydrate to the extruder barrel, or may be added to the extruder barrel prior to or after the protein and carbohydrates sources.

The protein and carbohydrate sources, any additional water, and any further optional ingredients added to the extruder barrel (together referred to as the "barrel mixture") may be mixed and heated in the extruder barrel at one or more temperatures in the range of about 40-180° C. For example, one or more temperature zones may exist where the dough is subjected to a temperature or series of temperatures to create a temperature profile, in the range of about 40-60° C., 45-65° C., 50-70° C., 55-75° C., 60-80° C., 65-85° C., 70-90° C., 75-95° C., 80-100° C., 85-105° C., 90-110° C., 95-115° C., 100-120° C., 105-125° C., 110-130° C., 15-135° C., 120-140° C., 125-145° C., 130-150° C., 135-155° C., 140-160° C. 145-165° C., 150-170° C., 155-175° C. or 160-180° C.

The extruder barrel may have a plurality of temperature zones, for example up to 10 zones. In some embodiments, the extruder barrel may have one, two, three, four, five or six temperature zones, e.g. 3-6 zones. In some embodiments, the temperature in each zone is different from all the others. In some embodiments, two or more zones may have the same temperature, optionally separated by one or more different temperature zones. In some embodiments, where there are two or more temperature zones, the temperature of each successive zone may be different from the immediately preceding and succeeding zones, for example by increasing the temperature as the protein-carbohydrate mixture travels through each zone along the length of the extruder, with the final zone lower in temperature than the preceding zone.

In some embodiments the initial or first temperature zone is in the range of about 40-80° C., e.g. 50-80° C. In some further embodiments, the final temperature zone is in the range of about 65-140° C., e.g. 70-130° C. In still further embodiments intermediate temperature zones between the first and final zones are independently in the range of about 60-170° C., e.g., 60-150° C.

In some embodiments the temperature profile contains three temperature zones, for example:
T1: 40-80° C., such as 50-70° C.,
T2: 60-160° C., such as 60-150° C., and
T3: 70-130° C., such as 80-100° C. or 110-120° C.

In some embodiments, the temperature profile contains four temperature zones, for example T1: 50-80° C., such as 55-65° C.,
T2: 60-120° C., such as 60-110° C.,
T3: 70-160° C., such as 70-150° C. and
T4 70-130° C., such as 80-100° C. or 110-130° C.

In some embodiments the temperature profile contains five temperature zones, for example:
T1: 40-80° C., such as 50-70° C.,
T2: 60-140° C., such as 60-130° C.,
T3: 70-150° C., such as 100-130° C. or 110-140° C.
T4: 80-160° C., such as 100-150° C. and
T5: 70-130° C., such as 80-100° C. or 110-120° C.

In some embodiments the temperature profile contains six temperature zones, for example:
T1: 40-80° C., such as 50-70° C.,
T2: 60-140° C., such as 60-130° C., and
T3: 70-150° C., such as 80-100° C. or 110-140° C.
T4: 80-160° C., such as 90-150° C.
T5: 80-160° C., such as 100-150° C.
T6: 70-130° C., such as 80-100° C. or 110-120° C.

In some further embodiments thereof, the temperature of each zone increases up to the final zone.

In some embodiments, the screw(s) may be configured to introduce additional shear in one or more zones compared to other zones.

The length of time that the protein-carbohydrate mixture spends in each zone may be varied and may be determined by the appropriate screw speed, for example 50-500 rpm, such as 100-400 or 150-250 rpm. In some embodiments, the retention time of the protein carbohydrate mixture in each zone is independently from 2-3 seconds, up to about 2-4 minutes, for example 5-20 seconds, 30-50 seconds, 60-90 seconds, 120-180 seconds In some embodiments, the plasticized protein and carbohydrate mixture exiting the extruder barrel (for example at a temperature in the range of about 80-100° C. or 100-120° C.) is subjected to cooling or ambient temperature or further heating within a die situated at the barrel exit point. The die may be any suitable length and have a bore of any suitable diameter. In some embodiments the die has a bore length of from about 10 cm to about 100 cm, for example about 15, 20, 25, 30, 35, 40, 45, 50, 55, 60, 65, 70, 75, 80, 85, 90, or 95 cm. The bore may be any suitable shape, for example, circle, oval, square, or rectangular, and in some embodiments, may have a diameter or cross-sectional measurement in the range of about 10-100 mm, such as 15, 20, 25, 30, 35, 40, 45, 50, 55, 60, 65, 70, 75, 80, 85, 90 or 95 mm.

In some embodiments, the protein-carbohydrate composite exiting the extruder is held in the die for about 10-100 seconds, for example, 20, 25, 30, 35, 40, 45, 50, 55, 60, 65, 70, 75, 80, 85, 90 or 95 seconds. In some embodiments, die pressure may be in the range of about 0.5 MPa to about 20.0 MPa, dependent at least in part on the bore size, for example, about 0.75, 1.0, 1.25, 1.50, 1.75, 2.0, 2.25, 2.50, 2.75, 3.0, 3.25, 3.50, 3.75, 4.0, 4.25, 4.5, 4.75, 5.0, 5.25, 5.5, 5.75, 6.0, 7-10, 10-12, 12-15 or 15-17 or 17-20 MPa. The die may be cooled (for example with water at 20-25° C.), be neither actively heated nor cooled, or may be further heated (e.g. at 80-120° C. or 100-140° C.) to maintain the extruder exit temperature or slow the rate of cooling of the protein-carbohydrate composite within the die. In some embodiments, the temperature, pressure and holding time within the die are such that they may allow for the formation of Maillard reaction products within the die.

The extruded protein-carbohydrate composite may be subjected to further drying. In some embodiments, the protein-carbohydrate composite is dried at a temperature of about 85° C. or less or 80° C. or less, 75° C. or less, 70° C. or less for at least 2-3 hours, or at least 4-6, or at least 7-9 or at least 10-12 hours or at least 14-16 hours or at least 18-20 hours or at least 22-24 hours. In some embodiments, drying temperature and time are such that they may allow for the formation of Maillard reaction products.

By varying one or more process parameters such as protein and carbohydrate sources, including physical and/or chemical pre-treatment of one or both individual or combined protein and carbohydrate sources, ingredient quantities, pH, screw speed, temperature, pressure and time within the extruder barrel, and temperature, pressure and time within the holding die, and drying conditions, a variety of textural food ingredient structures, with various properties can be formed, for example, soft, fibrous texture, cartilaginous, elastic, crumbly etc.

In some embodiments, protein-carbohydrate composites have water retention or water uptake properties that may advantageously contribute to a desirable mouthfeel (moistness or "juiciness") of the final food product. In alternative embodiments, protein-carbohydrate composites have water retention or uptake properties that may advantageously contribute to a fibrous or cartilaginous structure or texture to the final food product Thus, in some preferred embodiments, the protein-carbohydrate composite has a water retention capacity, as defined by a moisture uptake on a dry weight basis, of at least 90%, for example at least 95%, or at least 100%, or at least 105%, or at least %, 110%, or at least 115%, or at least 120%, or at least 125%, or, at least 130%, or at least 135%, at least 140%, or at least 145%, or, at least 150%, or at least 155%, or at least 160%, or at least 165%, or at least 170%, or at least 175%, or at least 180%, or at least 185%, or at least 190% or at least 195%, or at least 200%, or at least 205%, or at least 210%, or at least 215%, or at least 220%, or at least 225%, or at least 230%, or at least 235%, or at least 240%, or at least 245%, or at least 250%. In some embodiments, a moisture uptake on a dry weight basis of less than about 120% affords a cartilaginous structure. In some embodiments, a moisture uptake of about 120% or greater may provide a softer structure. The extrudate may be hydrated by soaking in water (e.g. 10-30° C., 40-60° C. or 70-100° C.°) for a period of from 2-3 minutes, 10-30 minutes or about 60, 90, 120, 150 or 180 minutes.

In some embodiments, the extrudate (fresh or dried), for use as a food ingredient, has a moisture content of, or less than, about 50% by weight of the extrudate. In further embodiments, the extruded food ingredient has a moisture content in the range of about 50-45% by weight of the extrudate, or 45-40% by weight of the extrudate, or 40-35% by weight of the extrudate, or 35-30% by weight of the extrudate, or 30-25% by weight of the extrudate, or 25-20% by weight of the extrudate, or 20-15% by weight of the extrudate, or 15-10% by weight of the extrudate, or 10-5% by weight of the extrudate or 5-0% by weight of the extrudate, for example 47-43% by weight of the extrudate, 43-37% by weight of the extrudate, 37-33% by weight of the extrudate, 33-27% by weight of the extrudate, 27-23% by weight of the extrudate, 23-17% by weight of the extrudate, 17-13% by weight of the extrudate, 13-7% by weight of the extrudate, or 7-3% by weight of the extrudate. In further embodiments, the extrudate has a moisture content of about 19, 18, 17, 16, 15, 14, 13, 12, 11, 10, 9, 8, 7, 6, 5, 4, 3, 2, or 1% by weight of the extrudate.

The extruded food ingredients (fresh, or dried, and optionally further hydrated) may be used to prepare meat mimetic food products for human or animal consumption, such as ground or minced meat, by combining one or more of the extruded food ingredients (for example having different textures to mimic one or more textures and/or sensory attributes of animal meat) with additional ingredients, including any such ingredients as previously described, to form meat mimetic food products. Some examples of additional ingredients may include: binding and thickening agents (e.g., gums, pectins, starches, egg, potato flakes, potato flour, flours made from milled or ground grains and legumes (wheat, rice, rye oats barley, buckwheat, corn, lupin, chickpea, lentil, bean etc), protein-carbohydrate MRPs,), flavouring agents (e.g. salt, meat flavour (such as pork, beef or chicken flavour), herbs, spices, vegetable flavour (e.g. celery, onion, garlic), yeast extract, sugars, (e.g. glucose, sucrose, dextrose), natural and artificial sweeteners, smoke flavour, monosodium glutamate), fats, oils and lipids (e.g. coconut oil, palm stearin, olive oil, vegetable oil, canola oil and other oils mentioned previously), colouring agents, nutritional agents (e.g. amino acids, vitamins, minerals, resistant starch and dietary fibre as mentioned previously) and preservatives. Optionally, the meat mimetic food product may contain a proportion (for example from up to about 1-2%, 5%, 10%, 20%, 30%, 40% or 50% w/w) of an animal derived (e.g. fish, shellfish, poultry (e.g. chicken, duck, goose, turkey), bovine, porcine, ovine, caprine, equine) ingredient, such as muscle, blood, fat, cartilage and connective tissue, offal (organs), gelatin, casein and caseinates (e.g. calcium or sodium), whey, milk protein concentrate, milk protein isolate, and egg or components thereof (e.g. albumin, lecithin).

In some embodiments, the food ingredients may be used in the preparation of a meat mimetic food product such as a ground or shredded meat product, for example, burger patties, kebabs, meat balls, meat loaves, sausages, meat sauces and fillings (e.g. chilli, bolognaise, taco fillings, pie fillings), and other formed or shaped meat products (optionally crumbed) such as nuggets, steaks, cutlets, schnitzels, fingers and strips. In some further embodiments the food ingredient may be used in the preparation of burger patties. In some embodiments the food product is free or substantially free of one or more agents that cause allergic or intolerant reactions, such as gluten or nuts.

The disclosure will now be further described by reference to the following examples, which are intended for the purpose of illustration only, and are not to be construed as limiting the generality described above.

EXAMPLES

Materials

Protein-based ingredients: The ingredients used were: (i) Pea protein isolate: NUTRALYS® S85F Roquette, 84% protein (min), pH at 10% (w/w) 7.5 approx., Aqueous solubility (pH 7) 55% Approx. (ii) Soy protein isolate: SPI Bulk Nutrients, 93.3% protein, 0.1% fat and 1.4% CHO, (iii) Soy protein isolate: 661 IP SPI Supro, 90% protein, dry basis, pH of 5% (w/w) slurry at 6.7-7.1, (iv) Faba bean isolate (Australian Plant Protein): 81% protein, Aqueous solubility at pH 7. Test range 85-90%. Textured soy protein (Arcon®), for comparison, was obtained from Archer Daniels Midland Company (ADM).

Carbohydrates: The ingredients used were: (i) Potato Flour Menora Foods, <1% protein, made from pre-cooked, dried and ground potato, (ii) Maltodextrin DE10 and Maltodextrin DE30: The Melbourne Food Ingredient Depot, (iii) k-Carrageenan: Axieo (CP Kelco), pH (0.5% solution) at 7.0-10.0 (iv) Pectin (High methoxy): The Melbourne Food Ingredient Depot, 70% degree of esterification, (v) Iota-carrageenan: The Melbourne Food Ingredient Depot, pH 8.6.

Oils: The fat used was palm stearin (Commercial name: CBS Besschoc 3934), FTA Food solutions Pty Ltd, except for some burger formulation trials, where coconut fat was used.

Others: Wheat flour (use as binder in burger formulations): Woolworths All Purpose Wheat Flour, Protein 10.9%; Carbohydrate (CHO) 70.4%; Fat 1.3%; Fibre 3.5%; Moisture 13.9%.

Extrusion Trials

Preliminary Assessment of Low Moisture Extrusion for Altering Ingredient Functionality Extrusion trials were conducted using the following ingredients under low moisture extrusion conditions.

(a) Protein source alone—pea protein isolate,
(b) Protein-carbohydrate blends
(c) Protein-carbohydrate blends with oil-in-water emulsion (stabilized by Tween 40) substituted as part of the aqueous phase.

Figure 1B:
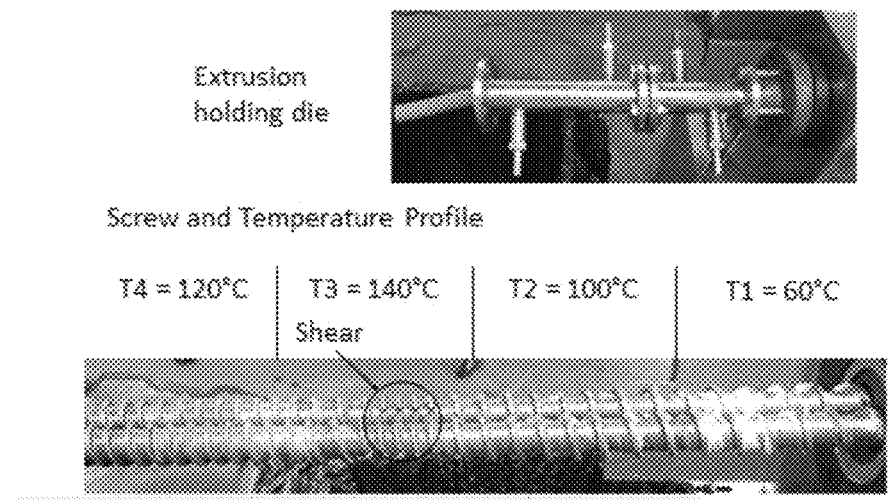
FIG. 1B illustrates a screw and temperature profile for selected sections of an exemplary long die extrusion trial.

A lab scale twin-screw extruder (DSE32-II, Jinan Kredit Machinery Co. Ltd., Shandong, China) was used. The temperature profile along the extruder barrel from feed to die entry with and without using the holding die were set to 60, 100, 140 and 90 or 120° C. (T1, T2, T3 and T4) respectively. The basic screw configuration from feed to the die was built with CE/37.5/37.5/8 and CE/25/45/8 to represent 8 conveying element with 37.5 mm length and 37.5° helix angle and 8 conveying element with 25 mm length and 25° helix angle was used with interrupted flight replacing a small screw element at T2 or T3 position for added shearing of protein and protein with maltodextrin, pectin or carrageenan (FIG. 1). The standard round die without a holding tube attached or with a breaking plate with holding tube of various lengths (153, 243 mm or combined) was used without temperature control after the 120° C. barrel zone. FIG. 1 shows selected sections of the extruder A summary of the extrusion trials carried out and conditions of processing are given below. The initial trials 1-13 were conducted without the long die. Subsequently the long die (LD) was introduced as the long die enabled the holding of the extrudate when it exited from the section of the extruder with the screws to allow holding to form textured protein carbohydrate composites. A short die (SD) was also used in some experiments.

Where oil was added, palm stearin was emulsified with Tween 40. The emulsion was prepared by combining 10 g Tween 40 to 1 kg water at 50° C. and 1 kg melted palm stearin (~60° C.) and emulsifying with a Silverson mixer, to obtain a 50% oil in water emulsion. The emulsion feed was used with the liquid feed in order to obtain the desired oil loading and the target barrel moisture level.

The formulations and conditions used for production of extrudates are presented in Tables 1-3.

TABLE 1

Formulation and Processing Conditions for Production of Extrudates containing Pea Protein

| No. | Formulation* | Liquid phase | Barrel Moisture | Die Pressure (MPa) | Feed Rate (kg/hr) | Screw Speed (rpm) | Output Rate (kg/hr) | Die | Treatment after extrusion |
|---|---|---|---|---|---|---|---|---|---|
| | Extrusion Trial 1-Initial trial to assess effects of different CHO |
| 1 | PPI | Water | 38 | 2 | 6 | 154 | | Round | dry at 85° C. 18 hrs |
| 2 | PPI | Water | 35 | 4 | 6 | 154 | | Round | dry at 85° C. 18 hrs |
| 3 | PPI | Water | 31 | 4.5 | 6 | 154 | | Round | dry at 85° C. 18 hrs |
| 4 | PPI | Water | 35 | 4 | 6 | 115 | | Round | dry at 85° C. 18 hrs |
| 5 | PPI | Water | 35 | 3.5 | 6 | 231 | | Round | dry at 85° C. 18 hrs |
| 6 | PPI | Water | 35 | 5.25 | 9.1 | 231 | | Round | dry at 85° C. 18 hrs |
| 7 | PPI | Water | 35 | 4.5 | 9.1 | 231 | | Round | dry at 85° C. 18 hrs |
| 8 | PPI:MD30DE (67:33) | Water | 36 | 2.7 | 8.7 | 231 | | Round | dry at 85° C. 18 hrs |
| 9 | PPI:MD30DE (67:33) | Water | 36 | 2.7 | 8.7 | 115 | | Round | dry at 85° C. 18 hrs |
| 10 | PPI:MD30DE (67:33) | Water | 35 | 2.3 | 5.3 | 115 | | Round | dry at 85° C. 18 hrs |
| 11 | PPI:Pectin E 50-75 (96:4) | Water | 35 | 2.3 | 6 | 115 | | Round | dry at 85° C. 18 hrs |
| 12 | PPI:Pectin E 50-75 (96:4) | Water | 30 | 3 | 6 | 115 | | Round | dry at 85° C. 18 hrs |
| 13 | PPI:Pectin E 50-75 (96:4) | Water | 30 | 3.5 | 9.1 | 115 | | Round | dry at 85° C. 18 hrs |
| | Extrusion Trial 3-Introduction of the long die to enhance Maillard reaction post-extrusion |
| LD1 | PPI:MD30DE (67:33) | Water | 40 | 1.2 | 5.3 | 154 | | Long die (400 mm) | dry at 85° C. 18 hrs |
| LD2 | PPI:MD30DE (67:33) | Water | 37 | 1.45 | 5.3 | 154 | | Long die (400 mm) | dry at 85° C. 18 hrs |
| LD3 | PPI:MD30DE (67:33) | Water | 34 | 1.6 | 5.3 | 154 | 7.97 | Long die (400 mm) | dry at 85° C. 18 hrs |
| LD4 | PPI:MD30DE (67:33) | Water | 34 | 1.9 | 5.3 | 231 | | Long die (400 mm) | dry at 85° C. 18 hrs |
| LD5 | PPI:MD30DE (67:33) | Water | 34-36 | 1.75 | 8.7 | 154 | 12.2 | Long die (400 mm) | dry at 85° C. 18 hrs |
| LD6-1 | PPI:Pectin E 50-75 (96:4) | Water | 35 | 1.75 | 9.1 | 154 | | Long die (400 mm) | dry at 85° C. 18 hrs |
| LD6-2 | PPI:Pectin E 50-75 (96:4) | Water | 35 | 1.75 | 9.1 | 154 | | Long die (400 mm) | dry at 85° C. 18 hrs |
| LD7 | PPI:Pectin E 50-75 (96:4) | Water | 31 | 1.75 | 6 | 154 | 6.84 | Long die (400 mm) | dry at 85° C. 18 hrs |
| | Extrusion Trial 4-Preliminary investigation of oil incorporation |
| Added oil | PPI:pectin:MD (94:4:2) | 16.6% oil-in-water emulsion | 38 | 0.8 | 6 | 154 | | Short die (160 mm) | dry at 85° C. 18 hrs |
| | Extrusion Trial 5-Effect of use of short or long die post-extrusion |
| LDW 40 | PPI:pectin (96:4) | Water | 35 | 0.85 | 9.1 | 154 | | Long die (400 mm) | fridge, freeze or dry at 85° C. 18 hrs |
| LDW 40 | PPI:pectin (96:4) | Water | 32 | 1.45 | 9.1 | 154 | | Long die (400 mm) | fridge, freeze or dry at 85° C. 18 hrs |
| SDW 40 | PPI:pectin (96:4) | Water | 32 | 1.3 | 9.1 | 154 | | short die (160 mm) | fridge, freeze or dry at 85° C. 18 hrs |
| | Extrusion Trial 6-One formulation (Testing effect of drying time at 75° C.) |
| LD45 D2 | PPI:pectin (96:4) | Water | 35 | 1.68 | 9.1 | 154 | 14.53 | Long die (400 mm) | dry at 75° C. 2 hrs |
| LD45 D4 | PPI:pectin (96:4) | Water | 35 | 1.68 | 9.1 | 154 | 14.53 | Long die (400 mm) | dry at 75° C. 4 hrs |
| LD45 D6 | PPI:pectin (96:4) | Water | 35 | 1.68 | 9.1 | 154 | 14.53 | Long die (400 mm) | dry at 75° C. 6 hrs |
| | Extrusion Trial 7 (Food Grade)- |
| LD45 | PPI:pectin (96:4) | Water | 35 | 1.68 | 9.1 | 154 | 14.53 | Long die (400 mm) | dry at 85° C. 19 hrs |

*Formulation was based on ingredient weight

TABLE 2

Formulation and Processing Conditions for Production of Extrudates containing Soy Protein

| No. | Formulation* | Liquid phase | Barrel Moisture | Die Pressure (bars) | Feed Rate (kg/hr) | Screw Speed (rpm) | Die** | Treatment after extrusion | Comments |
|---|---|---|---|---|---|---|---|---|---|
| | | | Extrusion Trial 8-Use of SPI & Faba bean protein powder | | | | | | |
| 8:1 | SPI:potato starch (80:20) | Water | 35 | 1.3-1.6 | 6.1 | 154 | SD | o/n 4° C. 6 hrs 80° C. | Extruded well |
| 8:2 | SPI:MDDE30 (80:20) | Water | 35 | 1.3-1.6 | 5.3 | 154 | SD | o/n 4° C. 6 hrs 80° C. | Extruded well |

*Ingredient wt basis;
**Short die
Note:
Screw profile with interrupted flight for mixing, short die (160 mm length) and 60, 100, 140 & 120° C. barrel temperature profile was used

TABLE 3

Formulation and Processing Conditions for Production of Extrudates containing Soy Protein

| No. | Formulation* | Liquid phase | Barrel Moisture | Die Pressure (MPa) | Feed Rate (kg/hr) | Screw Speed (rpm) | Output Rate (kg/hr) | Die* | Treatment after extrusion | Comments |
|---|---|---|---|---|---|---|---|---|---|---|
| 9:1 | SPI:Pectin (90:10) | Water | 35 | 1.6-2.5 | 6.6 | 154 | | LD | 6 hrs 80° C. | Extruded well |
| 9:2 | SPI:Pectin (90:10) | Water | 35 | 1.6-2.5 | 6.6 | 154 | | SD | o/n 4° C. 6 hrs 80° C. | |
| 9:3 | SPI:Pectin (90:10) | 0.2 M NaOH | 35 | 1.6-2.5 | 6.6 | 154 | | SD | o/n 4° C. 6 hrs 80° C. | |
| 9:4 | SPI:ι-carrageenan (98:2) | Water | 35-40 | 6-12 | 4.8 | 154 | | SD | o/n 4° C. | |
| 9:5 | SPI:ι-carrageenan (98:2) | NaOH 0.2 M | 35-40 | 6-12 | 4.8 | 154 | | SD | o/n 4° C. | |

*Screw profile with interrupted flight for mixing, long die (400 mm length) short die (160 mm length) and 40-60, 100, 140 & 120° C. barrel temperature profile was used.

Extrusion conditions were varied to obtain PPI-pectin conjugates with improved meat analogue properties.

Physical Characterization of Extrudates

Moisture content of extrudates: Extrudates (3.0-4.0 g) were dried in an oven at 105° C. for 24 h. The dried weight of the extrudates were taken. % Moisture and dry matter content were calculated as follows.

% moisture=100×(weight before drying-weight after drying/weight before drying)

% dry matter=100−% moisture.

Hydration properties of extrudates: Extrudates containing protein, protein-carbohydrate or protein-carbohydrate-oil were covered with boiling water (1 part extrudate: 3 parts water) and left for 30 min or 120 min or 180 min or for 30 min after hydration with boiling water or cold water. The hydrated extrudates were drained and squeezed by hand to expel the water. The weights of the expelled water and hydrated extrudates were recorded. The water uptake by the extrudates was calculated. For comparison between the hydration properties of the extrudates with different moisture contents, the water uptake was also expressed as % water uptake on a dry ingredient basis.

Characteristics of Extrudates from Extrusion Trials

Extrudates with various formulations were produced using a range of extrusion variables and drying conditions post-extrusion using the raw ingredients (See Tables 1-3)

Estimate of Gross Composition

The calculated proximate composition is given in Table 4. Note: The estimates of the gross composition of extrudates is based on proximate composition of typical 84% protein isolate, carbohydrate and other ingredients for extrusion. It also assumes that there is no loss of the components (except water) during extrusion and the post drying process.

TABLE 4

Estimated % proximate composition of extrudates

| Extrudate | Moisture | Protein | CHO | Fat | Fibre | Ash |
|---|---|---|---|---|---|---|
| | | Extrusion Trial 1 | | | | |
| #4-PPI | 17.1 | 72.5 | 0.4 | 3.5 | 1.6 | 5.0 |
| #9-PPI:MD30DE (67:33) | 9.9 | 52.8 | 29.8 | 2.5 | 1.1 | 3.8 |
| #12-PPI:Pectin E 50-75 (96:4) | 9.8 | 75.8 | 3.6 | 3.6 | 2.0 | 5.2 |

TABLE 4-continued

Estimated % proximate composition of extrudates

| Extrudate | Moisture | Protein | CHO | Fat | Fibre | Ash |
|---|---|---|---|---|---|---|
| #13-PPI:Pectin E 50-75 (96:4) | 6.8 | 78.3 | 3.7 | 3.7 | 2.0 | 5.4 |
| Extrusion Trial 3 | | | | | | |
| LD5A-PPI:MD30DE (67:33) (small pieces) | 7.7 | 54.1 | 30.5 | 2.6 | 1.2 | 3.9 |
| LD6-1-PPI:Pectin E 50-75 (96:4) | 4.0 | 80.7 | 3.8 | 3.9 | 2.1 | 5.6 |
| LD6-1-PPI:Pectin E 50-75 (96:4) | 4.0 | 80.7 | 3.8 | 3.9 | 2.1 | 5.6 |
| Extrusion Trial 4 | | | | | | |
| PPI:Pectin:MD (94:4:2)-High oil (50% long strands and 50% small pieces) | 17.5 | 33.9 | 2.5 | 42.9 | 0.9 | 2.4 |
| PPI:Pectin:MD-No oil | 34.6 | 53.8 | 3.9 | 2.6 | 1.4 | 3.7 |
| PPI:Pectin:MD-Medium oil (16.6% fat emulsion) | 25.9 | 42.7 | 3.1 | 24.3 | 1.1 | 3.0 |
| PPI:Pectin:MD-High oil-long strands (Long strands only) | 18 | 33.7 | 2.4 | 42.6 | 0.9 | 2.3 |
| PPI:Pectin:MD-High oil-small pieces (Small pieces only) | 16.7 | 34.3 | 2.5 | 43.3 | 0.9 | 2.4 |
| Extrusion Trial 5 | | | | | | |
| PPI-pectin (96:4) LD 45 Dry extrudate | 4.0 | 80.7 | 3.8 | 3.9 | 2.1 | 5.6 |
| PPI-pectin (96:4) LD 40 Dry extrudate | 4.5 | 80.2 | 3.8 | 3.8 | 2.1 | 5.6 |
| PPI-pectin (96:4) SD 40 Dry extrudate | 3.2 | 81.3 | 3.8 | 3.9 | 2.1 | 5.6 |
| PPI-pectin (96:4) LD 45 Fresh extrudate | 34.3 | 55.2 | 2.6 | 2.6 | 1.4 | 3.8 |
| PPI-pectin (96:4) LD 40 Fresh extrudate | 32.0 | 57.1 | 2.7 | 2.7 | 1.5 | 4.0 |
| PPI-pectin (96:4) SD 40 Fresh extrudate | 30.2 | 58.6 | 2.8 | 2.8 | 1.5 | 4.0 |
| PPI-pectin (96:4) LD 45 fresh extrudate stored at 4° C. for 1 week | 34.3 | 55.2 | 2.6 | 2.6 | 1.4 | 3.8 |
| PPI-pectin (96:4) LD 40 fresh extrudate stored at 4° C. for 1 week | 32.0 | 57.1 | 2.7 | 2.7 | 1.5 | 4.0 |
| PPI-pectin (96:4) SD 40 fresh extrudate stored at 4° C. for 1 week | 30.2 | 58.6 | 2.8 | 2.8 | 1.5 | 4.1 |
| PPI-pectin (96:4) LD 45 fresh extrudate stored at −20° C. for 1 week | 34.3 | 55.2 | 2.6 | 2.6 | 1.4 | 3.8 |
| PPI-pectin (96:4) LD 40 fresh extrudate stored at −20° C. for 1 week | 32.0 | 57.1 | 2.7 | 2.7 | 1.5 | 4.0 |
| PPI-pectin (96:4) SD 40 fresh extrudate stored at −20° C. for 1 week | 30.2 | 58.6 | 2.8 | 2.8 | 1.5 | 4.0 |
| Arcon T U crumble 240 (ADM)** | 5.0 | 55.3 | 12.5 | 3.1 | 18.8 | 5.2 |
| Extrusion Trial 6 | | | | | | |
| PPI-pectin (96:4) LD 45 dried at 75° C. for 2 hrs | 18.9 | 68.1 | 3.2 | 3.3 | 1.8 | 4.7 |
| PPI-pectin (96:4) LD 45 dried at 75° C. for 4 hrs | 11.9 | 74.0 | 3.5 | 3.5 | 1.9 | 5.1 |

TABLE 4-continued

| Estimated % proximate composition of extrudates | | | | | | |
|---|---|---|---|---|---|---|
| Extrudate | Moisture | Protein | CHO | Fat | Fibre | Ash |
| PPI-pectin (96:4) LD 45 dried at 75° C. for 6 hrs | 8.4 | 76.9 | 3.6 | 3.7 | 2.0 | 5.3 |

For contribution of ingredients to gross composition, the following estimates were used: Pea Protein Isolate contains 84.00% protein, 0.40% CHO (soluble sugars), 4.00% fat, 1.80% fibre, 5.80% ash, 4.00% moisture (Functional properties of protein isolates from beach pea Lathyrus maritius-L-Scientific Figure on ResearchGate. Available from:https://www.researchgate.net/figure/Chemical-composition-of-beach-pea-protein-isolates-a_tbl1_248510145 [accessed 17 Jun., 2019]);
MD contains 93.4% CHO, 0.6% ash, 6% moisture; Pectin contains 0.3% protein, 81% CHO, 0.3% fat, 9% fibre, 0.21% ash, 9.19% moisture.
*Fat content calculated assuming no loss of oil during extrusion and may be an over-estimate. The extrudates were not homogenous and there was some leakage of oil observed during extrusion,
**ADM textured vegetable protein (TVP) product added in for comparison.

Appearance

Figure 2:
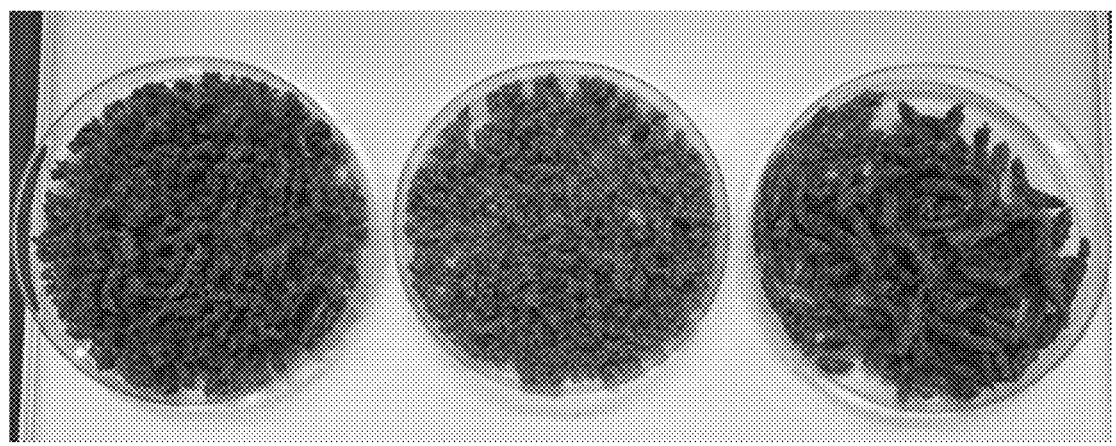
FIG. 2 illustrates extrudates made from pea protein isolate or mixtures of pea protein isolate and carbohydrates: (PPI—pea protein isolate, MD DE30, maltodextrin with dextrose equivalent of 30, Pectin E50-75—high methoxy pectin).
Figure 4:
FIG. 4 illustrates extrudate made with pea protein isolate, carbohydrates and oil emulsion.
Figure 5:
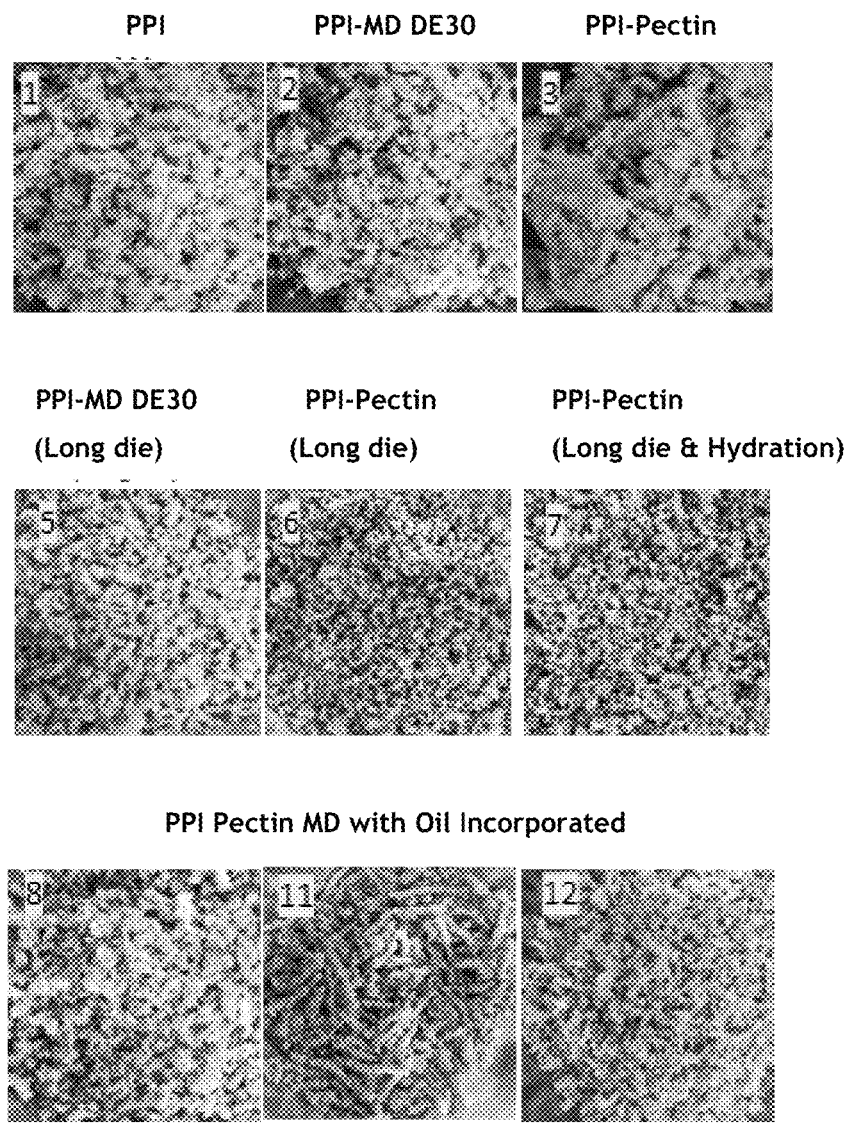
FIG. 5 illustrates rehydrated extrudates made from PPI, PPI-MD DE30 and PPI-pectin. The moisture uptake (based on solids, dry basis) is improved by the addition of a carbohydrate source. The introduction of a long die (40 mm) reduces moisture uptake. Oil incorporation reduces moisture uptake
Figure 6:
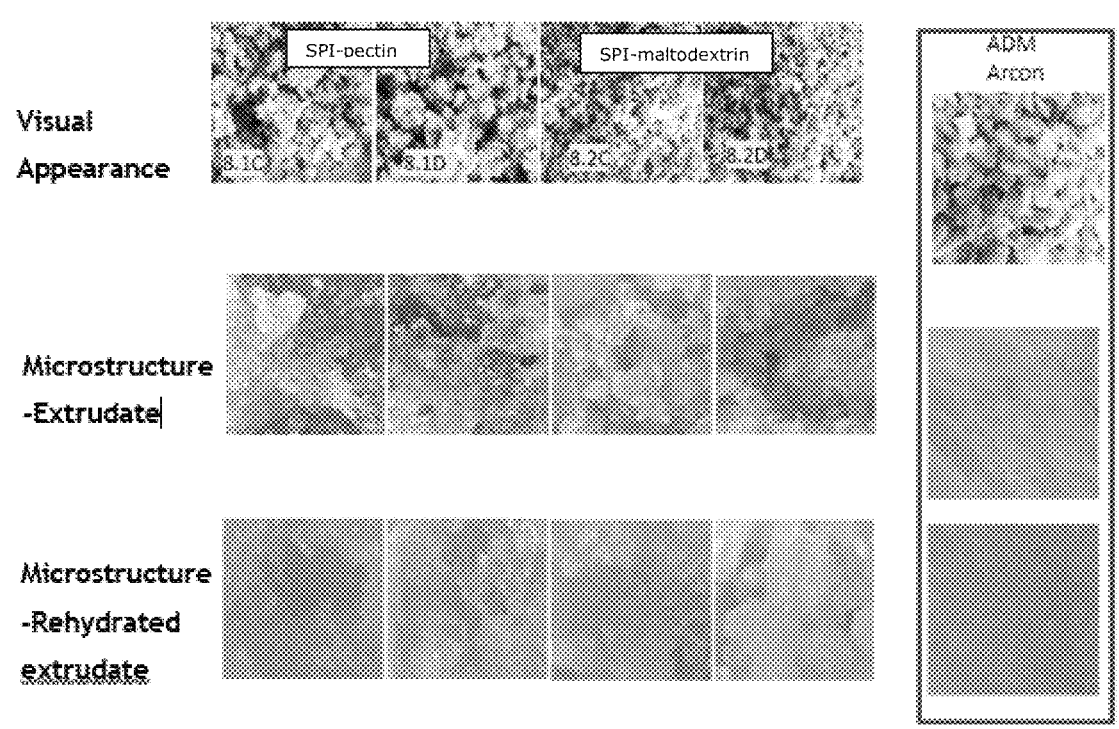
FIG. 6 illustrates rehydrated extrudates prepared from soy protein isolate (SPI):potato starch and SPI:maltodextrin, as well as Acron® soy protein concentrate.
Figure 7:
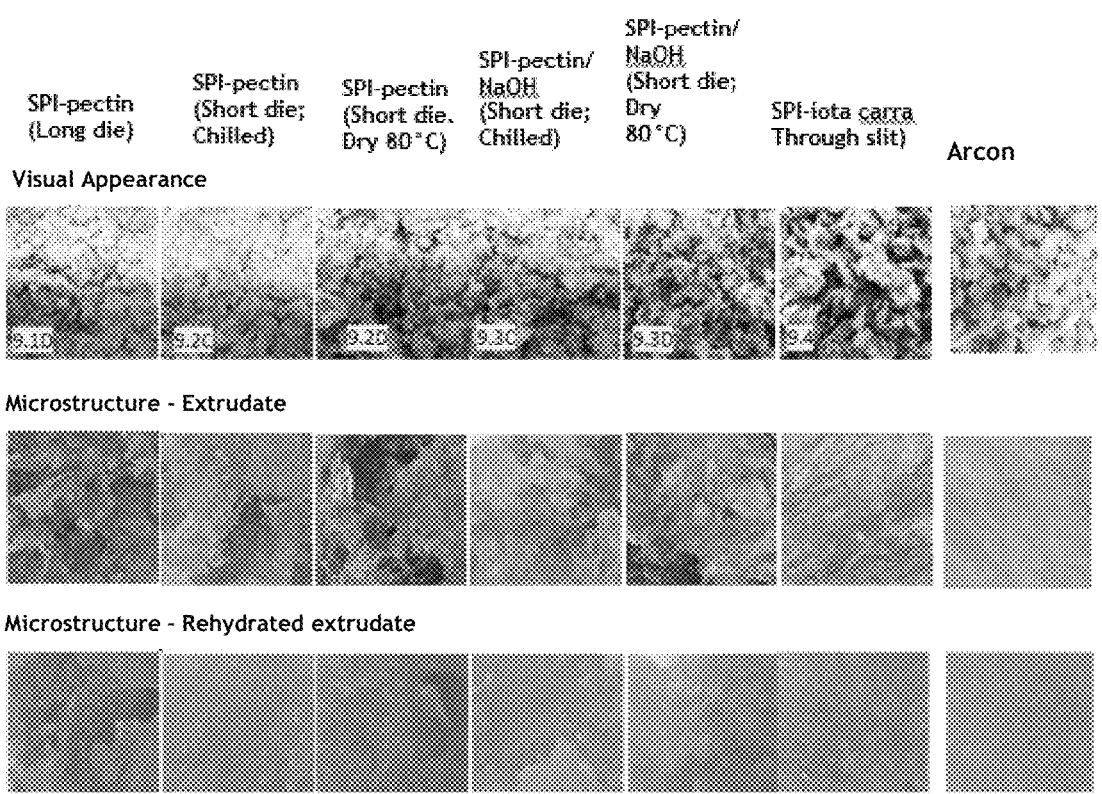
FIG. 7 illustrates various rehydrated SPI:pectin extrudates compared to Acron® soy protein concentrate

Different structures were formed depending on the protein, protein-carbohydrate and protein-carbohydrate-oil mixture. Selected examples are shown in FIGS. 2 and 4.

The introduction of a long holding die, which increased the time duration the protein-carbohydrate mixture was exposed to high temperature (between 120-140° C. for 20 sec or >100° C. for 1 min), resulted in fusion of components of the extrudates.

Hydration of Extrudates

Tables 5-7 provide summaries of characteristics on hydration of various extrudates obtained.

TABLE 5

Moisture uptake of the extrudates.

| No. | Extrudate | Moisture content of extrudate used (%) | % moisture uptake by extrudate (dry basis) | Hydration time (min) | Comments |
|---|---|---|---|---|---|
| | Extrusion Trial 1-Effect of type of CHO | | | | |
| 1 | 4-25 Jan. 2019 PPI | 17.1 | 172 | 30 | At current extrusion condition, PPI alone has lower water uptake than protein-CHO |
| 2 | 9-25 Jan. 2019 PPI:MD30DE (67:33) | 9.9 | 195 | 30 | PPI-MD has better water binding than PPI-pectin |
| 3 | 12-25 Jan. 2019 PPI:Pectin E 50-75 (96:4) | 9.8 | 176 | 30 | PPI-pectin has more water uptake than PPI |
| 4 | 13-25 Jan. 2019 PPI:Pectin E 50-75 (96:4) | 6.8 | 180 | 30 | Water uptake for same formulation was different with change in extrusion variable |
| | Extrusion Trial 3-Introduction of long die | | | | |
| 5 | LD5A-22 Feb. 2019 PPI:MD30DE (67:33) (small pieces) | 7.7 | 127 | 30 | For corresponding formulations in Extrusion Trials 1 & 3, Lower water uptake when die pressure is decreased, screw speed is increased and long die was used (See Table 2 for extrusion Conditions) |
| 6 | LD6-1-22 Feb. 2019 PPI:Pectin E 50-75 (96:4) | 4.00 | 128 | 30 | |
| 7 | LD6-1-PPI:Pectin E 50-75 (96:4) | 4.00 | 128 | 120 | |
| | Extrusion Trial 4-Oil incorporation | | | | |
| 8 | PPI:Pectin:MD-High oil (long strands:small pieces, 1:1) | 17.5 | 82 | 30 | Lower values of water uptake for oil containing samples (based on ingredient wt.) is expected (actual fat content needed to calculate water uptake on a non-fat solids basis for a better comparison). Small pieces hydrate better. |
| 9 | PPI:Pectin:MD-No oil | 34.6 | 113 | 30 | |
| 10 | PPI:Pectin:MD-Medium oil | 25.9 | 97 | 30 | |
| 11 | PPI:Pectin:MD-High oil-long strands (Long strands only) | 18.0 | 111 | 180 | |
| 12 | PPI:Pectin:MD-High oil-small pieces (Small pieces only) | 16.7 | 126 | 180 | |
| | Extrusion Trial 5 | | | | |
| 13 | PPI-pectin (96:4) LD 45 Dry extrudate | 4.00 | 119 | 120 | Major difference between water uptake-Use of short die results in higher water uptake than long holding die (differences between extrusion variables for long die are over-riden by postdrying step) When long die is used, effect of using fresh vs dried is dependent on extrusion conditions |
| 14 | PPI-pectin (96:4) LD 40 Dry extrudate | 4.5 | 118 | 120 | |
| 15 | PPI-pectin (96:4) SD 40 Dry extrudate | 3.2 | 151 | 120 | |
| 16 | PPI-pectin (96:4) LD 45 Fresh extrudate | 34.3 | 121 | 120 | |
| 17 | PPI-pectin (96:4) LD 40 Fresh extrudate | 32.0 | 142 | 120 | |

TABLE 5-continued

Moisture uptake of the extrudates.

| No. | Extrudate | Moisture content of extrudate used (%) | % moisture uptake by extrudate (dry basis) | Hydration time (min) | Comments |
|---|---|---|---|---|---|
| 18 | PPI-pectin (96:4) SD 40 Fresh extrudate | 30.2 | 147 | 120 | Drying of extrudate (Short die)-little difference in water uptake with fresh |
| 19 | PPI-pectin (96:4) LD 45 fresh extrudate stored at 4° C. for 1 week | 34.3 | 113 | 120 | Compare to corresponding non-stored (16, 17, 18) Little change in water uptake |
| 20 | PPI-pectin (96:4) LD 40 fresh extrudate stored at 4° C. for 1 week | 32.0 | 131 | 120 | |
| 21 | PPI-pectin (96:4) SD 40 fresh extrudate stored at 4° C. for 1 week | 30.2 | 144 | 120 | |
| 22 | PPI-pectin (96:4) LD 45 fresh extrudate stored at -20° C. for 1 week | 34.3 | 115 | 120 | Compare to corresponding non-stored (16, 17, 18) Little change in water uptake for LD but marked change for SD |
| 23 | PPI-pectin (96:4) LD 40 fresh extrudate stored at -20° C. for 1 week | 32.0 | 139 | 120 | |
| 24 | PPI-pectin (96:4) SD 40 fresh extrudate stored at -20° C. for 1 week | 30.2 | 118 | 120 | |
| ADM Product | | | | | |
| 25 | Arcon T U crumble 240 | 5.0 | 254 | 120 | ADM product-Best water binding properties |
| Extrusion Trial 6-One formulation (Testing effect of drying time at 75° C.) | | | | | |
| 26 | PPI-pectin (96:4) LD 45 dried at 75° C. for 2 hrs | 18.9 | 143 | 120 | Post extrusion drying at 75° C. improves water binding |
| 27 | PPI-pectin (96:4) LD 45 dried at 75° C. for 4 hrs | 11.9 | 151 | 120 | |
| 28 | PPI-pectin (96:4) LD 45 dried at 75° C. 6 hrs | 8.4 | 153 | 120 | |

*Hydration with boiling water

TABLE 6

Hydration Properties of Extrudate/TVP

| No. | Extrudate/TVP | Moisture content of extrudate used (%) | % moisture uptake by extrudate (dry basis) | Hydration conditions |
|---|---|---|---|---|
| 8:1 | SPI:potato starch (80:20) (Chilled o/n 4° C.) | 29.2 | 199 | 30 min (boiling water) |
| | SPI:potato starch (80:20) (Chilled o/n 4° C.) | 29.2 | 163 | 30 min (cold water) |
| | SPI:potato starch (80:20) (Dry 6 hrs 80° C.) | 5.9 | 170 | 30 min (boiling water) |
| | SPI:potato starch (80:20) (Dry 6 hrs 80° C.) | 5.9 | 128 | 30 min (cold water) |
| 8:2 | SPI:MDDE30 (80:20) (Chilled o/n 4° C.) | 32.6 | 136 | 30 min (boiling water) |
| | SPI:MDDE30 (80:20) (Chilled o/n 4° C.) | 32.6 | 118 | 30 min (cold water) |
| | SPI:MDDE30 (80:20) (Dry 6 hrs 80° C.) | 6.1 | 168 | 30 min (boiling water) |
| | SPI:MDDE30 (80:20) (Dry 6 hrs 80° C.) | 6.1 | 149 | 30 min (cold water) |
| ADM | Arcon T U-172 | 5.0 | 241 | 30 min (boiling water) |
| | Arcon T U-172 | 5.0 | 213 | 30 min (cold water) |

TABLE 7

Hydration Properties of Extrudate/TVP

| No. | Extrudate/TVP | Moisture content of extrudate used (%) | % moisture uptake by extrudate (dry basis) | Hydration conditions |
|---|---|---|---|---|
| 9:1 | SPI:Pectin (90:10) (LD Dry 6 hrs 80° C.) | 5.0 | 200 | 30 min (cold water) |
| 9:2 | SPI:Pectin (90:10) (SD Chilled o/n 4° C.) | 31.1 | 255 | 30 min (cold water) |
| | SPI:Pectin (90:10) (SD Dry 6 hrs 80° C.) | 4.9 | 196 | 30 min (cold water) |
| 9.3 | SPI:Pectin (90:10) (SD 0.2M NaOH Chilled o/n 4° C.) | 32.6 | 187 | 30 min (cold water) |
| | SPI:Pectin (90:10) (SD 0.2M NaOH Dry 6 hrs 80° C.) | 5.2 | 187 | 30 min (cold water) |
| 9.4 | SPI:Carrageenan (98:2) through slit | 28.2 | 193 | 30 min (cold water) |
| ADM | Arcon T U-172 | 5.0 | 262 | 30 min (cold water) |

Figure 3:
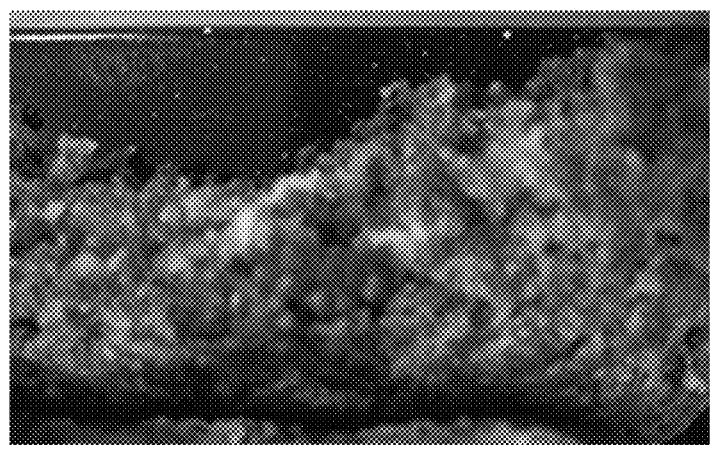
FIG. 3 shows cartilaginous structure in a burger patty formulation comprising a food ingredient extrudate (LD6-1) made with pea protein isolate and pectin, with inclusion of a long die for holding.

A range of products (protein ingredient or protein-carbohydrate formulations) were produced by extrusion under various processing conditions (barrel moisture, die pressure, feed rate, screw speed, with or without holding die post exit after extrusion) and selected drying conditions post-extrusion. Depending on the protein-carbohydrate formulation, the processing conditions and post-drying after extrusion, extrudates with a range of textures could be formed—from soft to fibrous to cartilaginous. As one example, a formulation comprising pea protein isolate with pectin (using the long holding die—400 mm) provided an extrudate with a fibrous structure (on a visual inspection) (FIG. 3).

In some embodiments, conditions the conditions below can be used as the basis for the production of cartilaginous and crumbly structures:

Preparation of Cartilaginous Structure:
Formulation (w/w): 96% PPI 4%: Pectin 70% esterification
Die: Long 400 mm
Barrel temperature: 60, 100, 140 and 120° C. (T1, T2, T3 & T4)
Barrel moisture content: 35%
Dry powder feed: 9.1 kg/hr
Screw speed: 154 rpm
Drying: for example, 85° C. for at least 12 hours
Production of Elastic More Crumbly Structure:
Formulation (w/w): 96% PPI: 4% Pectin 70° esterification or carrageenan/maltodextrin variation
Die: Short 160 mm
Barrel temperature: 60, 100, 140 and 120° C. (T1, T2, T3 & T4)
Barrel moisture content: 35%
Dry powder feed: 9.1 kg/hr
Screw speed: 154 rpm
Drying: for example, 85° C. (or lower) for at least 12 hours Example 2—Burger Patties Some extrudates prepared in Example 1 were formulated into patties.

Generally, extrudates were hydrated in boiling water (1 part extrudate: 3 parts water) and left for 2 h. The hydrated extrudates were drained and squeezed by hand to expel the water. The drained and squeezed extrudates were mixed with hydrogenated palm stearin (Besschoc 3934. FTA Food Solutions. Altona, Australia) and microwaved for 20 seconds to melt the solid fat. All-purpose wheat flour (Woolworths, Australia) was used as a binder as needed to hold the patty together. The mix of ingredients and amounts used for the formulation of the burger patties are given below. (Table 8).

TABLE 8

Formulation of the uncooked burgers

| Extrudate Type | Hydrated Extrudate* (g) | Fat (Palm stearinor coconut fat)(g) | Wheat flour or potato starch or MRP binder*(g) | Extra water (g) | Flavour (g) | Dextrose (g) | Total weight (g) |
|---|---|---|---|---|---|---|---|
| Burger Preparation Trial 1 using extrudates from Extrusion Trial 1 (palm stearin and wheat flour) ||||||||
| 4-PPI | 80.24 | 20.20 | 8.80 | 0.00 | 0.00 | 0.00 | 109.24 |
| 9-PPI:MD30DE (67:33) | 80.04 | 20.20 | 8.80 | 0.00 | 0.00 | 0.00 | 109.04 |
| 12-25 Jan. 2019 PPI:Pectin E 50-75 (96:4) | 80.48 | 20.25 | 4.40 | 0.00 | 0.00 | 0.00 | 105.12 |
| 13-25 Jan. 2019 PPI:Pectin E 50-75 (96:4) | 80.09 | 20.17 | 4.40 | 0.00 | 0.00 | 0.00 | 104.67 |
| Burger Preparation Trial 1 using extrudates from Extrusion Trial 3 (palm stearin and wheat flour) ||||||||
| LD5A-PPI:MD30DE (67:33)(small pieces) | 80.53 | 20.85 | 11.50 | 0.00 | 0.00 | 0.00 | 112.88 |
| LD6-1-PPI:Pectin E 50-75 (96:4) | 80.16 | 20.28 | 12.80 | 0.00 | 0.00 | 0.00 | 113.24 |
| Burger Preparation Trial 2 using extrudates from Extrusion Trial 4 (palm stearin and wheat flour) ||||||||
| PPI:Pectin:MD added oil | 82.80 | 8.06 | 10.02 | 0.00 | 0.00 | 0.00 | 100.88 |
| PPI:Pectin:MD added oil 2 | 82.12 | 8.05 | 10.06 | 0.00 | 0.00 | 0.00 | 100.23 |
| Burger Preparation Trial 3 using extrudates from Extrusion Trial 3 (palm stearin and wheat flour) ||||||||
| PPI-Pectin (96:4) Extrudate LD 6-1 Burger 1 | 80.77 | 20.39 | 10.05 | 10.01 | 0.00 | 0.00 | 121.23 |
| PPI-Pectin (96:4) Extrudate LP 6-1 Burger 2 | 80.22 | 20.06 | 10.01 | 5.02 | 0.00 | 0.00 | 115.31 |
| PPI-Pectin (96:4) Extrudate LD 6-1 Burger 3 | 80.44 | 20.40 | 10.03 | 5.03 | 0.00 | 0.00 | 115.91 |
| Burger Preparation Trial 5 using extrudates from Extrusion Trial 3 (palm stearin and wheat flour) ||||||||
| PPI-Pectin (96:4) Extrudate LD 6-1 (Flavour added to extrudate) | 80.03 | 20.14 | 10.15 | 5.03 | 0.06 | 0.52 | 115.92 |
| PPI-Pectin (96:4) Extrudate LD 6-1 (Flavour added to fat) | 80.22 | 20.46 | 10.08 | 5.03 | 0.06 | 0.52 | 116.36 |
| PPI-Pectin (96:4) Extrudate LD 6-1 (Flavour added to the binder) | 80.91 | 20.72 | 10.10 | 5.06 | 0.06 | 0.52 | 117.36 |
| Burger Preparation Trial 6 using extrudates from Extrusion Trial 5 (palm stearin and wheat flour) ||||||||
| PPI-Pectin (96:4) Extrudate LD 45 Dry | 80.39 | 20.03 | 10.11 | 5.16 | 0.00 | 0.00 | 115.68 |
| PPI-Pectin (96:4) Extrudate LD 40 Dry | 80.35 | 20.55 | 10.20 | 5.04 | 0.00 | 0.00 | 116.13 |
| PPI-Pectin (96:4) Extrudate SD 40 Dry | 80.55 | 20.27 | 10.23 | 5.15 | 0.00 | 0.00 | 116.21 |
| PPI-Pectin (96:4) Extrudate LD 45 Fresh (not dried) | 80.42 | 20.07 | 10.48 | 5.04 | 0.00 | 0.00 | 116.01 |

TABLE 8-continued

Formulation of the uncooked burgers

| Extrudate Type | Hydrated Extrudate* (g) | Fat (Palm stearin or coconut fat) (g) | Wheat flour or potato starch or MRP binder* (g) | Extra water (g) | Flavour (g) | Dextrose (g) | Total weight (g) |
|---|---|---|---|---|---|---|---|
| PPI-Pectin (96:4) Extrudate LD 40 Fresh (not dried) | 80.54 | 20.22 | 10.29 | 5.08 | 0.00 | 0.00 | 116.12 |
| PPI-Pectin (96:4) Extrudate SD 40 Fresh (not dried) | 80.41 | 20.19 | 10.32 | 5.19 | 0.00 | 0.00 | 116.11 |
| Burger Preparation Trial 7 using extrudates from Extrusion Trial 5 and Arcon TU crumble 240 (commercial TVP) (palm stearin and wheat flour) | | | | | | | |
| PPI-Pectin (96:4) Extrudate LD 45 Fresh stored at 4° C., 1 week | 80.44 | 20.17 | 10.26 | 5.01 | 0.00 | 0.00 | 115.88 |
| PPI-Pectin (96:4) Extrudate LD 40 Fresh stored at 4° C., 1 week | 80.23 | 20.12 | 10.34 | 5.02 | 0.00 | 0.00 | 115.71 |
| PPI-Pectin (96:4) Extrudate SD 40 Fresh stored at 4° C., 1 week | 80.34 | 20.01 | 10.23 | 5.05 | 0.00 | 0.00 | 115.6 |
| PPI-Pectin (96:4) Extrudate LD 45 Fresh stored at −20° C., 1 week | 80.29 | 20.11 | 10.24 | 5.06 | 0.00 | 0.00 | 115.70 |
| PPI-Pectin (96:4) Extrudate LD 45 Fresh stored at −20° C., 1 week | 80.29 | 20.22 | 10.26 | 5.18 | 0.00 | 0.00 | 115.95 |
| PPI-Pectin (96:4) Extrudate LD 45 Fresh stored at −20° C., 1 week | 80.09 | 20.19 | 10.07 | 5.01 | 0.00 | 0.00 | 115.36 |
| Arcon T U crumble 240 | 80.32 | 20.29 | 10.43 | 5.07 | 0.00 | 0.00 | 116.10 |
| Burger Preparation Trial 8 using extrudates from Extrusion Trial 6 (potato starch and coconut fat) | | | | | | | |
| PPI-Pectin (96:4) Extrudate LD 45 Dried at 75° C. for 2 h | 80.21 | 20.23 | 10.10 | 5.03 | 0.00 | 0.00 | 115.65 |
| PPI-Pectin (96:4) Extrudate LD 45 Dried at 75° C. for 4 h | 80.12 | 20.05 | 10.47 | 5.04 | 0.00 | 0.00 | 115.66 |
| PPI-Pectin (96:4) Extrudate LD 45 Dried at 75° C. for 6 h | 80.18 | 20.36 | 10.24 | 5.05 | 0.00 | 0.00 | 115.82 |
| Burger Preparation Trial 9 using extrudates from Extrusion Trials 5, 6 and Arcon TU crumble 240 (commercial TVP) (coconut fat and wheat flour/ or MRP binder** | | | | | | | |
| Extrudate LD 45 dried (equivalent to LD 6-1) | 80.02 | 20.36 | 10.38 | 5.03 | 0.00 | 0.00 | 115.79 |
| PPI-Pectin (96:4) LD 45 dried (LD 6-1) and LD 45 dried at 75° C. for 2 h (60:40) mix | 80.06 | 20.42 | 10.48 | 5.09 | 0.00 | 0.00 | 116.06 |
| Arcon TU crumble 240 | 80.23 | 20.22 | 10.45 | 5.07 | 0.00 | 0.00 | 115.97 |
| PPI-Pectin (96:4) Extrudate LD 45 dried (equivalent to LD 6-1) with heated protein-carbohydrate (MRP) binder | 80.18 | 20.25 | 20.80 | 0.00 | 0.00 | 0.00 | 121.24 |

*For the binder, either wheat flour or the MRP binder was used.
**For MRP binder, the PPI-starch mixture was heated prior to addition to formulation. MRP binder consists of 17.8% PPI, 13.79% potato starch and 68.41% water. The ingredients were mixed, and the pH was adjusted to 7.5. The mixture was stirred at 90° C. for 30 min.

The Beefmaster Premium gas barbeque unit (MC4PBSQ2, Barbeques Galore Artarmon) was used for grilling of the burgers. The BBQ unit was preheated to above 300° C. by turning all four BBQ burners on maximum until the gauge reached the middle of the red zone. Burgers were cooked on the hotplate side of the BBQ from frozen state for 2 mins on each side and then for 1 min each side until the inside temperature of the burger is over 72° C. If the temperature target is not reached, a further 1 min of cooking on each side was repeated until this is achieve with cooking time noted for each variation.

The hardness of cooked patties was determined using a puncture test. The test was performed using a Universal machine (Instron 6455, England) set at a compression mode. The 8 mm diameter probe penetrated the sample at 60 mm/min to achieve 50% deformation. At least 3 measurements were carried out for each sample. The force at a maximum peak when the probe break patty structure was identified as the hardness of the patties Cooking Trials Burgers from Preparation Trial 1

The burger prepared from extrudate 4 (PPI, no carbohydrate source) could not hold together properly while cooking. All other burgers kept intact. On flame grilling, the burger prepared from LD 5A and LD6-1 extrudates had aggregated structure, with that from LD6-1 in particular visually afforded desirable colour and cartilaginous texture (see FIG. 3).

Burgers from Preparation Trial 3

The ingredients did not hold together for the burger containing additional 10 g of water. The appearance of the cooked burgers was similar to that of LD6-1.

Burgers from Preparation Trial 6

The effect of using the long and short die on water binding capacity of resultant extrudates were tested in this trial. All the burgers were prepared using the same formulation: LD 6-1 and TU crumble 240 commercial TVP burgers were used as references. Burgers were prepared from long die and short die extrudates before drying and after drying (>8 h). Fresh extrudates were stored at 4° C. and −20° C. for 7 days were also used to prepare burgers using the same formulation. Fresh extrudates stored at 4° C. were also examined to study the changes in colour as a result of Maillard reaction and changes in other properties. Extrudates stored at −20° C. used as control. The burgers prepared with short die were more moist than the burgers from long die extrudates but is not have expected to have the mouth feel of a cartilaginous structure. Burgers prepared from long die extrudates were less moist but expected to have a gritty mouth feel due to its cartilaginous structure. Burger visual properties did not change significantly with the storage of extrudates.

Burgers from Preparation Trial 8

The extrudates were prepared to test the effect of drying time. The extrudates were dried at 75° C. for 2, 4 and 6 h. In this burger preparation formulation, the wheat flour was replaced with potato starch and the palm stearin was replaced with coconut fat. Wheat flour was a better binder than potato starch. The substitution of coconut fat did not show significant visual difference to the appearance of cooked burger. All the burgers had similar moistness. Burgers prepared from extrudates dried for 6 h had more cartilaginous appearance.

Burgers from Preparation Trial 9

Extrudate LD 6-1 and LD 45 dried at 75° C. for 2 h were mixed in 60:40 ratio to prepare the mix burger. One burger was prepared with only LD 6-1 and another was prepared only with commercial TVP (TU crumble 240) using wheat flour and coconut fat. One burger made with the protein-carbohydrate composite was prepared using LD 6-1 extrudate and MRP mixture as the binder. Cooked mix burger and MRP burger were more moist than cooked LD 6-1 burger. They also had cartilaginous texture Puncture Testing of Cooked Burger Testing of texture of some of the cooked burgers was carried out. The results are shown in Table 9.

TABLE 9

Hardness of cooked burger formulated extrudates

| Formulation | Maximum Load (N) | Moisture of cooked burger (%) | Informal assessment |
|---|---|---|---|
| Burger Preparation Trial 1 using extrudates from Extrusion Trail 1 | | | |
| 4-25 Jan. 2019 PPI | 24 | 44 | — |
| 9-25 Jan. 2019 PPI:MD30DE (67:33) | 14 | 52 | — |
| 12-25 Jan. 2019 PPI:Pectin E 50-75 (96:4) | 21 | 50 | — |
| 13-25 Jan. 2019 PPI:Pectin E 50-75 (96:4) | 23 | 47 | — |
| Burger Preparation Trial 1 using extrudates from Extrusion Trail 3* | | | |
| LD5A-22 Feb. 2019 PPI:MD30DE (67:33) (small pieces) | 35 | 42 | — |
| LD6-1-22 Feb. 2019 PPI:Pectin E 50-75 (96:4)-cooked on Aug. 3, 2019 | 43 | 40 | Dark brown, crumbly, crusty outside, moist inside |
| LD6-1-22 Feb. 2019 PPI:Pectin E 50-75 (96:4)-cooked on May. 4, 2019 | 33 | 37 | Dark brown, crumbly, crusty outside, moist inside |
| Burger Preparation Trial 6 & 7 using extrudates from Extrusion Trial 5 | | | |
| LD 40 Fresh extrudate PPI:Pectin HM (96:4) | 23 | 41 | Golden brown, very soft, more binding, crusty outside, moist inside |
| LD 40 Dry extrudate PPI:Pectin HM (96:4) | 29 | 39 | Slightly less dark, crustier, chewier and binding, dry |
| LD 40 stored at 4° C. PPI:Pectin HM (96:4) | 19 | 43 | Not significantly different to the fresh sample |
| LD 40 stored at −20° C. PPI:Pectin HM (96:4) | 20 | 46 | Similar colour and texture as LD40F |
| LD 45 Fresh extrudate PPI:Pectin HM (96:4) | 31 | 40 | Golden brown, crumbly, crusty outside, moist inside, slightly softer, more binding |
| LD 45 Dry extrudate PPI:Pectin HM (96:4) | 24 | 44 | Very similar to LD6-1, slightly more binding compared to LD6-1, dry |
| LD 45 stored at 4° C. PPI:Pectin HM (96:4) | 15 | 47 | Not significantly different to the fresh sample |
| LD 45 stored at −20° C. PPI:Pectin HM (96:4) | 27 | 41 | Similar colour and texture as LD45F |
| SD 40 Fresh extrudate PPI:Pectin HM (96:4) | 21 | 46 | Golden brown, very crumbly, crusty outside, moist inside, mushy |

TABLE 9-continued

Hardness of cooked burger formulated extrudates

| Formulation | Maximum Load (N) | Moisture of cooked burger (%) | Informal assessment |
|---|---|---|---|
| SD 40 Dry extrudate PPI:Pectin HM (96:4) | 34 | 39 | Same colour of LD40D, similar texture as LD45D |
| SD 40 stored at 4° C. PPI:Pectin HM (96:4) | 23 | 45 | Not significantly different to the fresh sample |
| SD 40 stored at −20° C. PPI:Pectin HM (96:4) | 19 | 48 | Similar colour and texture as S40F |
| Arcon T U-Crumble 240 | 14 | 52 | White colour, coarse structure, like chicken meat, moist |
| Burger Preparation Trial using extudates from Extrusion Trial 6** | | | |
| LD 45 Dried at 75° C. for 2 h PPI:Pectin HM (96:4)* | 7 | 48 | Moist, chewy, crust |
| LD 45 Dried at 75° C. for 4 h PPI:Pectin HM (96:4)* | 4 | 45 | Moist, chewy, crust |
| LD 45 Dried at 75° C. for 6 h PPI:Pectin HM (96:4)* | 6 | 43 | Moist, chewier, crustier than LD45-2hr |

*Fat used in burger formulation was palm stearin
**Fat used in burger formulation was coconut fat

The invention claimed is:

1. A process for preparing a protein-carbohydrate composite food ingredient, comprising mixing a protein source and a carbohydrate source in an extruder barrel and subjecting the mixture of the protein source and the carbohydrate source to extrusion to produce a protein-carbohydrate composite comprising protein-carbohydrate conjugates (Maillard reaction products);
   wherein the mixture in the extruder barrel qisilhas a total protein content of at least 80% w/w on a dry weight basis;
   wherein the extruder barrel has a total moisture content of 40% (w/w) or less than 40% (w/w); and
   wherein the carbohydrate source is selected from pectins, carrageenans and gums.

2. The process according to claim 1 wherein the protein source comprises one or more of a protein liquor, a protein concentrate and a protein isolate.

3. The process according to claim 1 wherein the protein source comprises one or more of pea protein liquor, pea protein concentrate, pea protein isolate, soy protein liquor, soy protein concentrate, soy protein isolate, faba bean liquor, faba bean concentrate, faba bean isolate, lupin protein liquor, lupin protein concentrate, or lupin protein isolate.

4. The process according to claim 1 wherein the carbohydrate source comprises one or more selected from gums, pectins, iota carrageenan, kappa carrageenan, lambda carrageenan, alginate, guar gum, xanthan gum, locust bean gum, gellan gum, methyl cellulose, gum carboxymethyl cellulose, cellulose and hemicellulose.

5. The process according to claim 1 wherein the carbohydrate source comprises one or more selected from high methoxy pectin and kappa carrageenan.

6. The process according to claim 1 wherein the carbohydrate source contains a reducing sugar.

7. The process according to claim 1 wherein the w/w ratio of the protein source to the carbohydrate source is from about 90:10 to about 99:1.

8. The process according to claim 1 wherein the total moisture content in the extruder is 39% (w/w) or less.

9. The process according to claim 8 wherein the total moisture content in the extruder is in a range of about 30-39% (w/w).

10. The process according to claim 1 wherein the extruder barrel contains 1-6 temperature zones.

11. The process according to claim 1 wherein the extruder barrel contains one or more zones heated to a temperature in a range of 40-180° C.

12. The process according to claim 11 wherein the extruder barrel contains one or more zones heated to a temperature in a range of 60-140° C.

13. The process according to claim 10 wherein the mixture of the protein source and the carbohydrate source has a retention time in each zone from 2-3 seconds to about 120-240 seconds.

14. The process according to claim 1 wherein the protein-carbohydrate composite exiting the extruder barrel is held in an ambient temperature or heated die.

15. The process according to claim 14, wherein the die is heated to a temperature in a range of about 80-120° C.

16. The process according claim 14 wherein the die has a bore length in a range of about 10-100 cm.

17. The process according to claim 16 wherein the bore length of the die is in a range of about 30-80 cm.

18. The process according to claim 14 wherein the protein-carbohydrate composite is held in the die for about 10-100 seconds.

19. The process according to claim 1 wherein the extruded protein-carbohydrate composite is further subjected to drying.

20. The process according to claim 19 wherein the drying is at a temperature of about 85° C. or less for a time from 2-3 hours.

21. The process according to claim 1 wherein the mixture in the extruder barrel does not contain, or does not substantially contain an edible fibre.

22. The process according to claim 1 wherein the mixture in the extruder barrel contains an edible fibre.

23. The process according to claim 9 wherein the total moisture content in the extruder barrel is less than 30% by weight.

24. The process according to claim 22 wherein the edible fibre is a member selected from the group consisting of oat bran, wheat bran, barley bran, corn bran and carrot fibre.

* * * * *